(12) United States Patent
Carter et al.

(10) Patent No.: US 12,721,318 B1
(45) **Date of Patent: *Sep. 1, 2026**

(54) DOG WALKING OR JOGGING APPARATUS AND METHOD

(71) Applicants: Jeffrey L. Carter, Buda, TX (US); Patricia S. Carter, Buda, TX (US); Lacey J. Carter, Buda, TX (US)

(72) Inventors: Jeffrey L. Carter, Buda, TX (US); Patricia S. Carter, Buda, TX (US); Lacey J. Carter, Buda, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 19/069,209

(22) Filed: Mar. 3, 2025

Related U.S. Application Data

(63) Continuation-in-part of application No. 17/153,052, filed on Jan. 20, 2021, now Pat. No. 12,239,104.

(51) Int. Cl.
*A01K 27/00* (2006.01)

(52) U.S. Cl.
CPC .......... *A01K 27/003* (2013.01); *A01K 27/002* (2013.01); *A01K 27/005* (2013.01); *A01K 27/006* (2013.01)

(58) Field of Classification Search
CPC .. A01K 27/002; A01K 27/003; A01K 27/005; A01K 27/006
See application file for complete search history.

(56) References Cited

U.S. PATENT DOCUMENTS

| | | | | |
|---|---|---|---|---|
| 4,134,364 A * | 1/1979 | Boncela | B62J 11/20 | 280/288.4 |
| 4,522,153 A * | 6/1985 | Vander Horst | A01K 27/005 | 119/799 |
| 4,541,364 A * | 9/1985 | Contello | A01K 27/005 | 119/772 |
| 4,854,269 A * | 8/1989 | Arntzen | A01K 1/04 | 119/703 |
| 5,103,771 A * | 4/1992 | Lee | A01K 27/005 | 119/776 |
| 5,580,069 A * | 12/1996 | Trejo | B62J 11/20 | 280/304.5 |
| 5,775,970 A * | 7/1998 | Klees | A63H 3/50 | 472/64 |
| 6,006,699 A * | 12/1999 | Keever | A01K 27/005 | 119/795 |
| 6,053,129 A * | 4/2000 | Akre | A01K 27/005 | 119/799 |
| 6,247,428 B1 * | 6/2001 | Mireles | A01K 27/003 | 119/771 |
| 6,557,498 B1 * | 5/2003 | Smierciak | A01K 27/006 | 119/858 |
| 9,314,002 B2 * | 4/2016 | Franey | A01K 27/006 | |

(Continued)

*Primary Examiner* — Joshua D Huson
*Assistant Examiner* — Edgar Reyes
(74) *Attorney, Agent, or Firm* — Rick B. Yeager

(57) ABSTRACT

A dog walking device to maintain a lateral offset between a dog and a walker or jogger. This lateral offset facilitates unimpeded forward movement of the walker or jogger by minimizing the dog's side to side movements which can disrupt the walker's or jogger's stride. The device has a spacer coil frame portion with a hand grip and a side mount attachment or top mount attachment to a dog harness or collar. A quick connector pair has a female connector on the spacer frame and a male connector attached to the harness or collar.

14 Claims, 36 Drawing Sheets

(56) References Cited

U.S. PATENT DOCUMENTS

| | | | | |
|---|---|---|---|---|
| 2005/0022752 | A1* | 2/2005 | Leon | A01K 1/04<br>119/771 |
| 2005/0034685 | A1* | 2/2005 | Chen | A01K 27/003<br>119/771 |
| 2007/0101950 | A1* | 5/2007 | Medlin | A01K 27/005<br>119/792 |
| 2007/0119385 | A1* | 5/2007 | Slank | A01K 27/005<br>119/776 |
| 2007/0193005 | A1* | 8/2007 | Chalk | A01K 27/003<br>24/265 H |
| 2009/0229536 | A1* | 9/2009 | Chen | A01K 1/04<br>280/288.4 |
| 2010/0018474 | A1* | 1/2010 | Noonan | A01K 27/004<br>24/713.6 |
| 2010/0319631 | A1* | 12/2010 | Rane | A01K 27/003<br>119/799 |
| 2011/0232031 | A1* | 9/2011 | Salais | F41H 9/10<br>16/111.1 |
| 2014/0076244 | A1* | 3/2014 | Byrne | A01K 27/003<br>119/799 |
| 2014/0283759 | A1* | 9/2014 | Bianchi | A01K 27/005<br>119/771 |
| 2015/0033542 | A1* | 2/2015 | Miron | A01K 27/005<br>29/515 |
| 2016/0249589 | A1* | 9/2016 | Soto | A01K 27/004<br>119/794 |
| 2017/0006833 | A1* | 1/2017 | Brogan | A01K 15/02 |
| 2019/0061860 | A1* | 2/2019 | Greiner | B62J 11/20 |
| 2020/0359604 | A1* | 11/2020 | Soto | A01K 27/001 |
| 2021/0059218 | A1* | 3/2021 | Benning | A01K 27/008 |

* cited by examiner

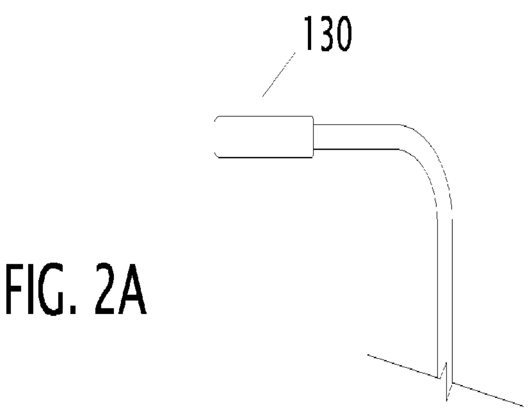
FIG. 2A
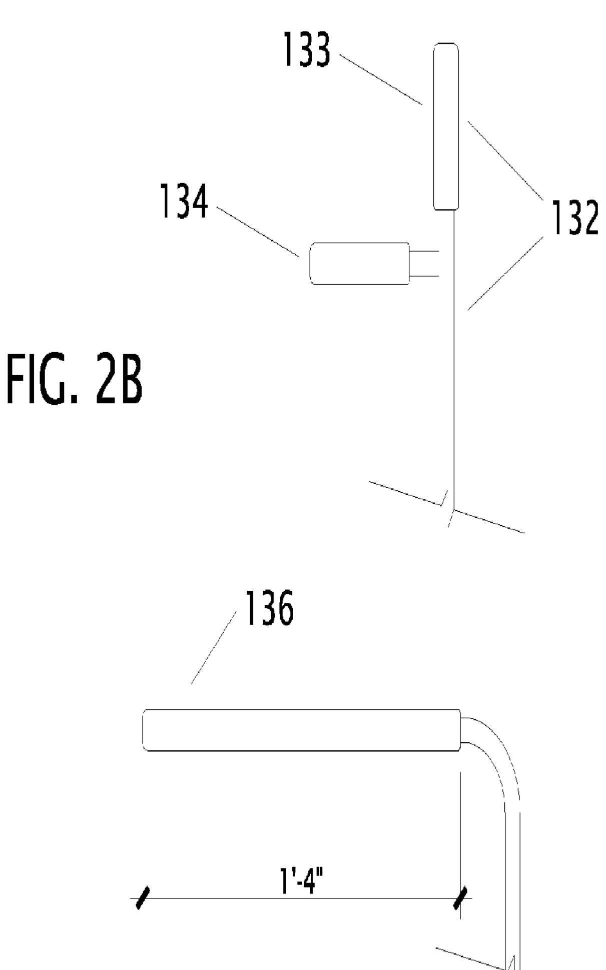
FIG. 2B
FIG. 2C 260
280
203
276

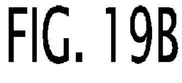
FIG. 19B
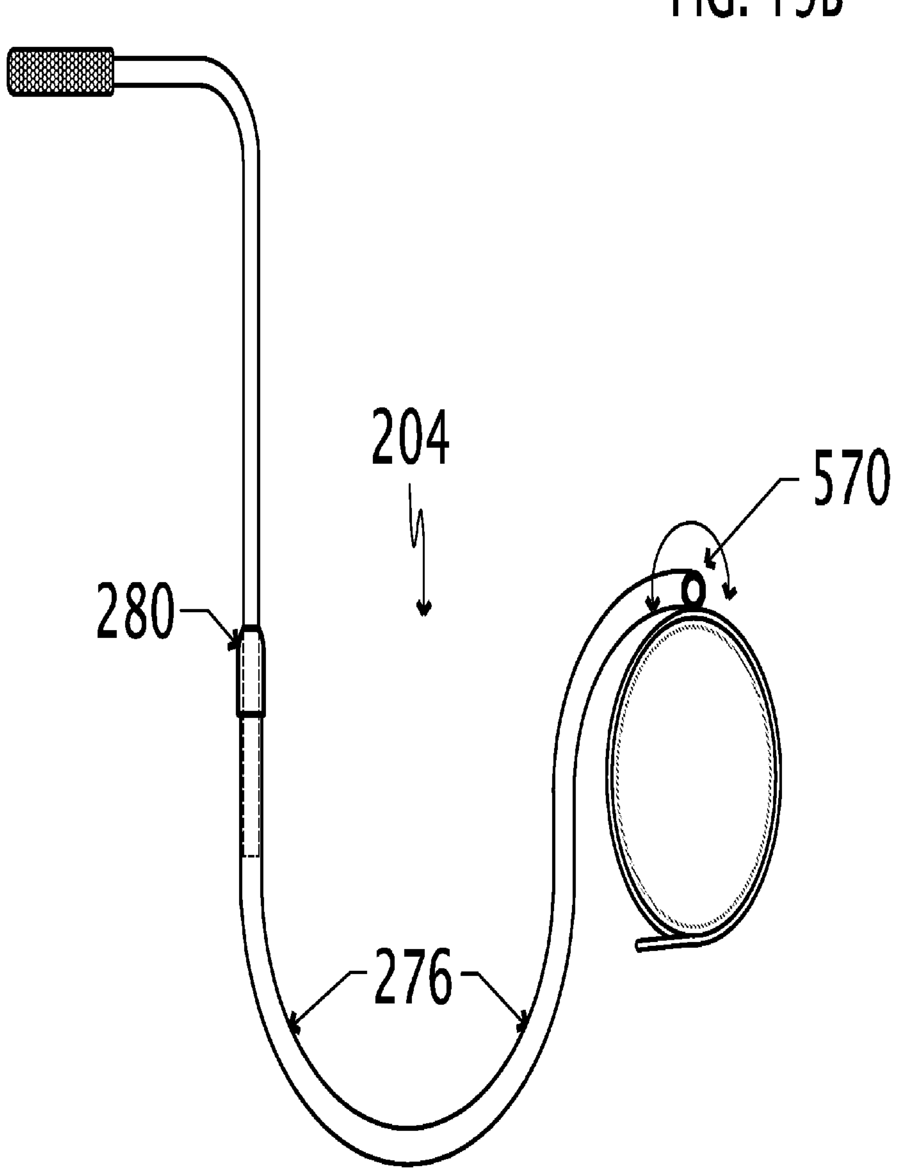
204
570
280
276

601
271
716
674
270

271
270
716
701

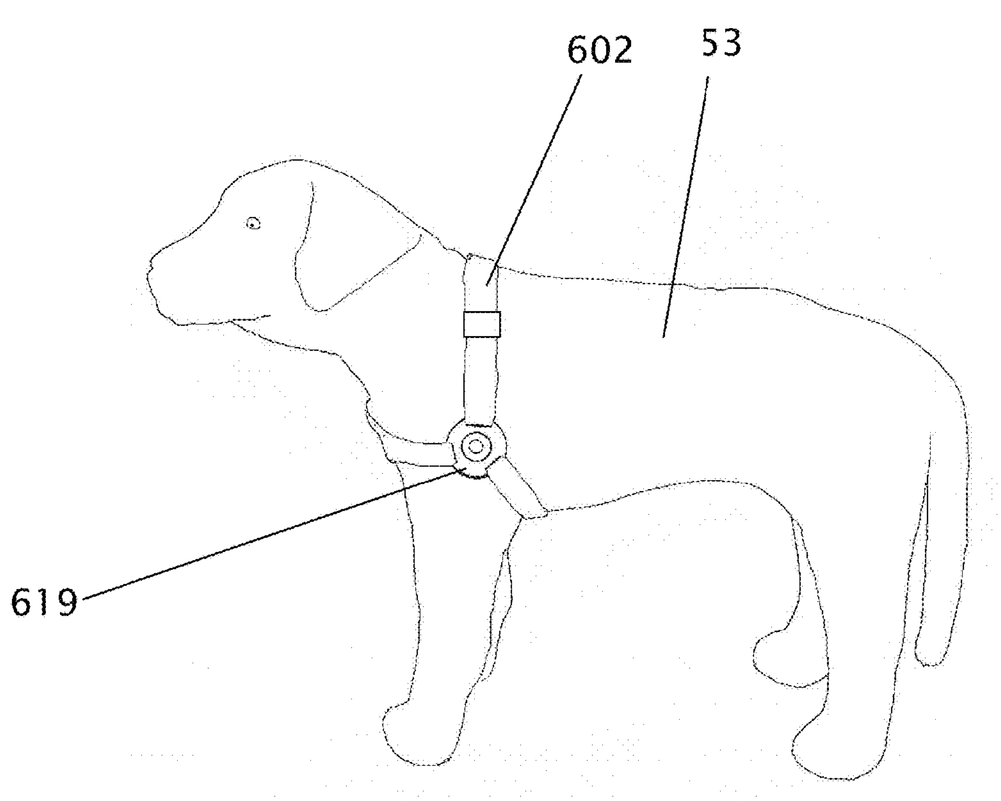
FIG. 23C
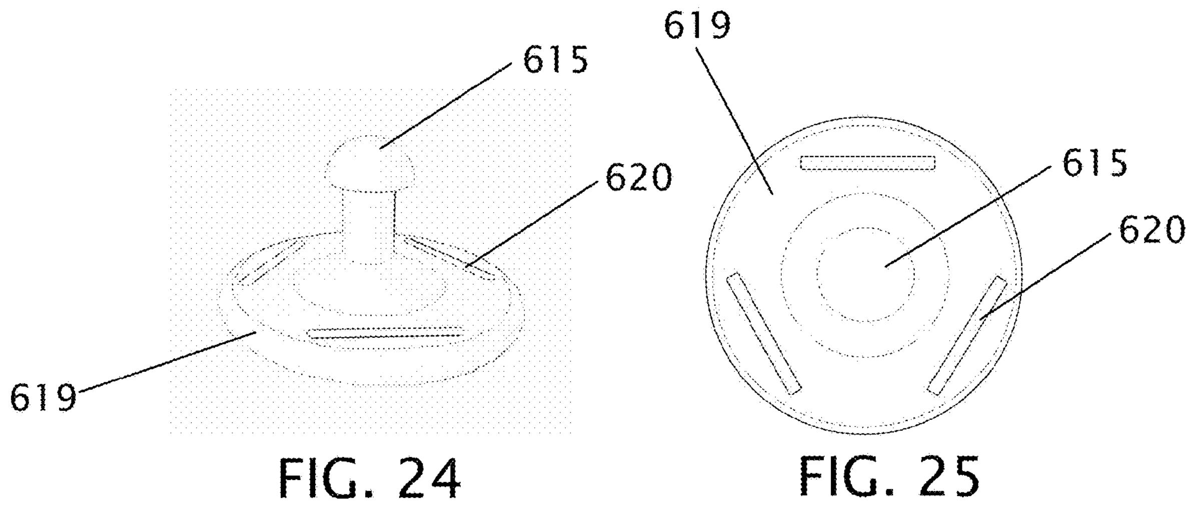
FIG. 24
FIG. 25

53
671
654
654
655
655
615
655
627

53
627
671
654
655
655
615

DOG WALKING OR JOGGING APPARATUS AND METHOD

RELATED APPLICATIONS

This US non-provisional patent application is a continuation-in-part of U.S. patent application Ser. No. 17/153,052 filed by applicants on Jan. 20, 2021.

BACKGROUND-FIELD OF INVENTION

The current invention relates to an apparatus and method for maintaining a separation distance while walking or jogging with a dog.

BACKGROUND-PRIOR ART

When a human is walking or jogging with a dog with a short leash, there is a risk that the dog can inadvertently trip the human, such as by abruptly cutting in front of the person.

The prior art discloses two methods to reduce this risk.

The first method is to us a rigid shaft, where one end of the shaft is held by the person, and the other end of the shaft is directly attached to the dog's collar or harness. Variations of this shaft method include providing a short length of chain or leash between the distal end of the shaft and the collar or leash; and routing a chain or leash through a hollow shaft.

A second method is to provide a much longer leash or lead. If the dog remains well ahead of the walker or jogger, this provides more reaction time for the person to avoid a collision. Disadvantages of this technique include reduced control over the dog, such as when other persons are animals are encountered, and increased risk of entanglement with trees, shrubs, poles, etc. along the route.

SUMMARY OF INVENTION

Objectives

The primary objective of the current invention is to provide a dog walking device for maintaining a lateral distance between a dog and a human while the dog and the human are walking or jogging on a surface. The device promotes parallel and linear forward pathways for both dog and human, and discourages lateral excursions and zigzagging movements by the dog that lead to collisions, leash entanglement and tripping between human and dog during forward movement. The device is unlike the traditional flexible dog leash which does not maintain a lateral distance.

The device is not a replacement for traditional leashes used to let dogs explore territory, satisfy bodily functions, and spend quality time with humans.

Another objective of the device is to facilitate an exercise routine for dog and human. This routine includes walking at a brisk pace or jogging for an extended period without disruption to that pace thereby maximizing the cardiovascular and other health benefits to dog and human.

Another objective is to provide a quick connection for attaching a harness or collar to the device frame.

Another objective is that, with repeated use, and over time, the use of this device will have training implications in that the dog will become accustomed to the routine and understand when the device is attached it is for the specific intent of walking briskly or jogging with their human companion and not stopping to sniff the neighborhood fire hydrant. It is also possible use of this device will transfer to traditional leash use and the dog will be more likely to follow the forward and linear pathway of the human assuming that is the intended movement at a given time.

Various assemblies, including side-mount attachment and top-mount attachment, are described for maintaining a lateral offset, typically in the range of 12-48 inches, between a dog and a walker or jogger.

Frame Embodiments

In one embodiment, a dog walking device comprises a frame with a single vertically oriented U shaped frame section. One end of the frame is attached to a dog collar or harness, and the other end of the frame is configured to be held by one or both hands while walking or jogging with the dog. The frame sections drop below the dog's neck so that the outermost frame section serves to provide a guide for the dog to maintain a lateral separation from the person. The frame may rotate with respect to the hand grip and/or the collar or harness.

In one embodiment, a dog walking device comprises a frame with plurality of vertically oriented U-shaped and inverted U-shaped frame sections.

In some examples the height of the frame may be adjusted, such as with a telescoping or spring pin connection. In one example, the frame comprises a single inverted U-shaped section with a U-shaped section to each side. In other examples, the lateral spacing of the frame may be increased by providing one or more additional inverted U-shaped sections and U-shaped sections. In some examples, a breakaway joint is provided near the collar or harness, and a safety cable may be routed through the frame. In some examples, the frame may be attached to a waist belt.

In another embodiment, a dog walking device comprises a frame with a single vertically oriented loop spacer frame section.

In another embodiment, a dog walking device comprises a frame with a coiled spring frame section.

In another embodiment, a dog walking device comprises a frame with plurality of horizontally oriented U-shaped and inverted U-shaped frame sections. One end of the frame is attached to a dog collar or harness, and the other end of the frame is configured to be held by one or both hands while walking or jogging with the dog. The frame may rotate with respect to the hand grip and/or the collar or harness.

In another embodiment, a dog walking device comprises a tubular frame with an upper bend in proximity to a hand grip, and a lower bend in proximity to a harness. The frame may rotate with respect to the hand grip and the harness.

In another embodiment, a dog walking device comprises a tubular frame trapezoidal frame with an upper rotational joint near a hand grip, and a lower rotational joint in proximity to the harness. harness. The frame may rotate with respect to the hand grip and the harness.

Spacer Coil Frame with Quick Connection

In other embodiments the dog walking device comprises a spacer coil frame and a quick connector assembly configured to releasably attach the frame to a collar or harness.

In some examples, the frame comprises a first vertically-oriented rigid U-shaped section and a vertically-oriented first inverted U-shaped section configured to be attached to the top of a harness or collar. A vertically-oriented male connection element on the distal end of the first inverted rigid U-shaped section is configured to mate with a vertically-oriented female connection element attached to, or integral to, a collar or harness This example is typically best suited for small dogs weighing 25 pounds or less, and the harness is typically a strap harness.

In some examples, the frame comprises a first vertically-oriented rigid U-shaped section, a vertically-oriented first inverted rigid U-shaped section, and a second vertically-oriented rigid U-shaped section with a horizontal extension configured to be attached to the a harness or collar. A horizontally-oriented male connection element on the distal end of the horizontal extension is configured to mate with a horizontally-oriented female connection element attached to, or integral to, a collar or harness. This example is typically best suited for medium size dogs weighing about 26-60 pounds, and the harness is typically a strap or tubular frame harness.

In other examples a threaded connection is used in order to provide a stronger connection than the quick connections.

BRIEF DESCRIPTION OF THE DRAWINGS

FIG. 2A is a front view of a rotating hand-grip.

FIG. 2B is a front view of a combination handle with both vertical and horizontal hand grips.

FIG. 2C is a front view of an elongated handle configured to be gripped by two hands.

FIG. 19B is a side view of the dog walking device of FIG. 19A.

FIG. 23C is a side view of the dog harness and dog of FIG. 23A.

FIG. 24 is a side view of a three-strap buckle connector side mount attachment configured for attachment to a harness.

FIG. 25 is a top view of the three-strap buckle connector side mount attachment of FIG. 24.

(FIG. 28 omitted)

(FIG. 30 omitted)

DETAILED DESCRIPTION

Figure 1:
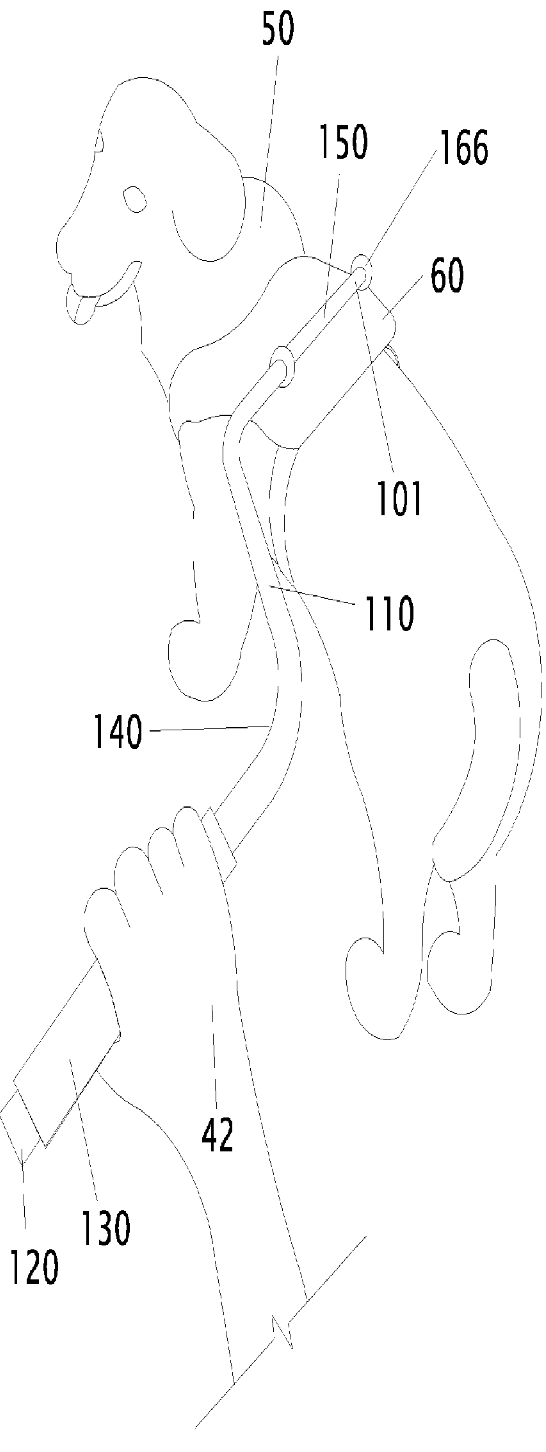
FIG. 1 is a top perspective view of an embodiment of a dog walking device.

In this specification, the term "dog walker" means a person who is walking or jogging with a dog.

In this specification, the term "dog walking device" means a frame having a proximal portion configured to be gripped by or attached to a dog walker; a distal portion configured to be attach able to a dog such as to a collar or harness; and a plurality of bends or joints between the proximal portion and the distal portion. The dog walking device may include various features such as one or more rotation joint, a breakaway joint, an adjustable telescoping frame segments, a safety cable or rope, or LED lighting.

In this specification, the term "vertical offset" means the approximate vertical height difference between the top of a dog's collar of harness and the hand or hands that holds the dog walking device.

In this specification, the term "horizontal offset" means the approximate minimum horizontal length difference between the top of a dog's collar of harness and the hand or hands that holds the dog walking device. For example, if both hands hold an elongated handle, then the horizontal offset is the horizontal length difference between the hand closest to the dog and the top of a dog's collar of harness.

In this specification, the term "rigid" means a dog walking device structural element with sufficient modulus to resist bending by forces exerted on the device by a dog.

In this specification, the term "semi-rigid" means a dog walking device structural element with sufficient modulus and elasticity to bend slightly in response to a force, and return to its normal orientation when the force is removed. For example, in some embodiments described below, the arms of multiple U-shaped or inverted U-shaped polymer sections may bend slightly inward or outward in response to forces exerted by the dog or dog walker, and then return to a normal orientation when that force is removed.

The following elements are listed for convenience in reviewing FIGS. 1-37B human 40
hand 42
dog 50
head 51
shoulder height b2
medium sized dog 25-60 pounds 53
small dog 25 pounds or less 54
harness 60
collar 70
dog walking device 101
frame 110
proximal end portion 120
rotatable grip handle 130
combination handle 132
vertical grip 133
horizontal grip 134
elongated handle 136
intermediate frame portion 140
upper bend 142
lower bend 144
distal end portion 150
harness connection 160
longitudinal harness connection 161
left side harness bracket 162
right side harness bracket 166
dog walking device 201, 202, 203, 204, 205
frame 210
proximal end portion 220
rotatable grip 230
combination handle 232
vertical grip 233
horizontal grip 234
non-telescoping rotational joint 320
intermediate frame portion 240
proximal U portion 270
vertical section 241
telescoping joint connector 280,281
upper section 241*a*
lower section 241*b*
bend section 242
vertical section 243
inverted U portion 272
vertical section 243
bend section 244
vertical section 245
distal U portion 274
vertical section 245
bend section 246
vertical section 247
universal ball joint 290
single U portion 276
spring coil portion 280
LED light 279
distal end portion 250
breakaway coupler 254
frame section 255
collar connection section 256
nipple 257
collar connection 260 safety cable 300
wrist strap 302
connector 304
belt assembly 310
belt 312
buckle 313
rotational joint 314
bearings 315
extension 316
connector 317
dog walking device 401
frame 410
proximal end portion 420
grip 430
rotational joint 422
intermediate frame section 440
trapezoidal frame 600
distal end portion 450
harness connection 460
rotational joints 462
dog walking device 501
frame 510
proximal end portion 520
rotational joint 522
intermediate frame portion 540
distal end portion 550
longitudinal harness connection 560
tubing with bearing rollers 562
rotational joint 570
top mount spacer coil frame assembly 701
top mount spacer coil frame 706
proximal U section 270
inverted U section 272
vertical handle 711
handle coupler 707
handle height adjustment locking tabs 708
horizontal handle stem 709
handle attachment ring 731
rubber bicycle grips 710
adjustable, no pull strap harness 713
single-strap buckle connector 714
male coupler 715
connector base 719
slots 720
side mount spacer coil frame assembly 601
side mount spacer coil frame 606
proximal U section 270
inverted U section 272
distal U section 274
horizontal extension 674
no pull strap harness with adjustable buckle 602
three-strap puck connector 603
vertical handle 611
handle coupler 607
handle height adjustment locking tabs 608
horizontal handle stem 609
handle attachment ring 631
rubber bicycle grips 610
female connector 612
male coupler 615
connector base 619
harness strap insert slot 620
quick connect assembly 630
quick-connect female connector 616
proximal end, internally threaded 631
outer cylinder 612
slotted internal cylinder 633
catch tabs 626
male connector 615
stem 660
enhanced quick connect assembly 630
threaded female connector 634
spring loaded external cylinder 635
catch collar 636*a*, 636*b*
full sphere male connector 637
stem 660
threaded housing connection assembly 640
distal end portion of spacer coil 641
female connector with internal female threads 647
full sphere with stem 648
spherical male connector 648
male connector stem 661
tubular harness 650
front arcing tube 671
rear arcing tube 672
left side rail 673
right side rail 674
adjustable chest strap 654
adjustable abdominal strap 655

Example—Dog Walking Device

FIG. 1 is a top perspective view of an embodiment of a dog walking device 101. In this example, the dog walking device has a frame 110 with proximal end portion 120, a distal end portion 150, and an intermediate frame portion 140. A rotatable grip 130 is provided on the frame proximal end portion 120. In this example, a harness connection 160 is provided on the distal end portion 150. In this example, the harness connection 160 is transverse with respect to the dog 50, and includes left side harness bracket 162 and a right side harness bracket 166. The distal end portion 150 of frame 110 can rotate with respect to the right and left side harness brackets. In other examples, the dog walking device may be attached to a collar or harness in a different orientation. In another example, for instance, the harness connection may be longitudinal with respect to the dog.

In this example, the frame is constructed of a rigid metal tube. The rotatable grip 130 permits the intermediate frame portion 140 to pivot with respect to the grip so that the distal end portion can be maintained in position above the dog's shoulders and with a constant lateral distance between the dog and the hand 42. This orientation permits the human to maintain a comfortable hand position while walking or jogging. The hand is not forced into a "handshake" orientation as with prior art straight bar-type devices.

Various types of grips may be used for this and other embodiments of dog walking devices. FIG. 2A is a front view of a rotating hand-grip 130. In this example, the hand-grip is provided on rotating bearings (not shown). FIG. 2B is a front view of a combination handle 132 with both a vertical grip 133 and a horizontal grip 134. FIG. 2C is a front view of an elongated handle 136 configured to be gripped by two hands. In one example, an elongated handle has a grip portion that is about 16 inches long.

Example—Collar-Mounted Dog Walking Device

Figure 3:
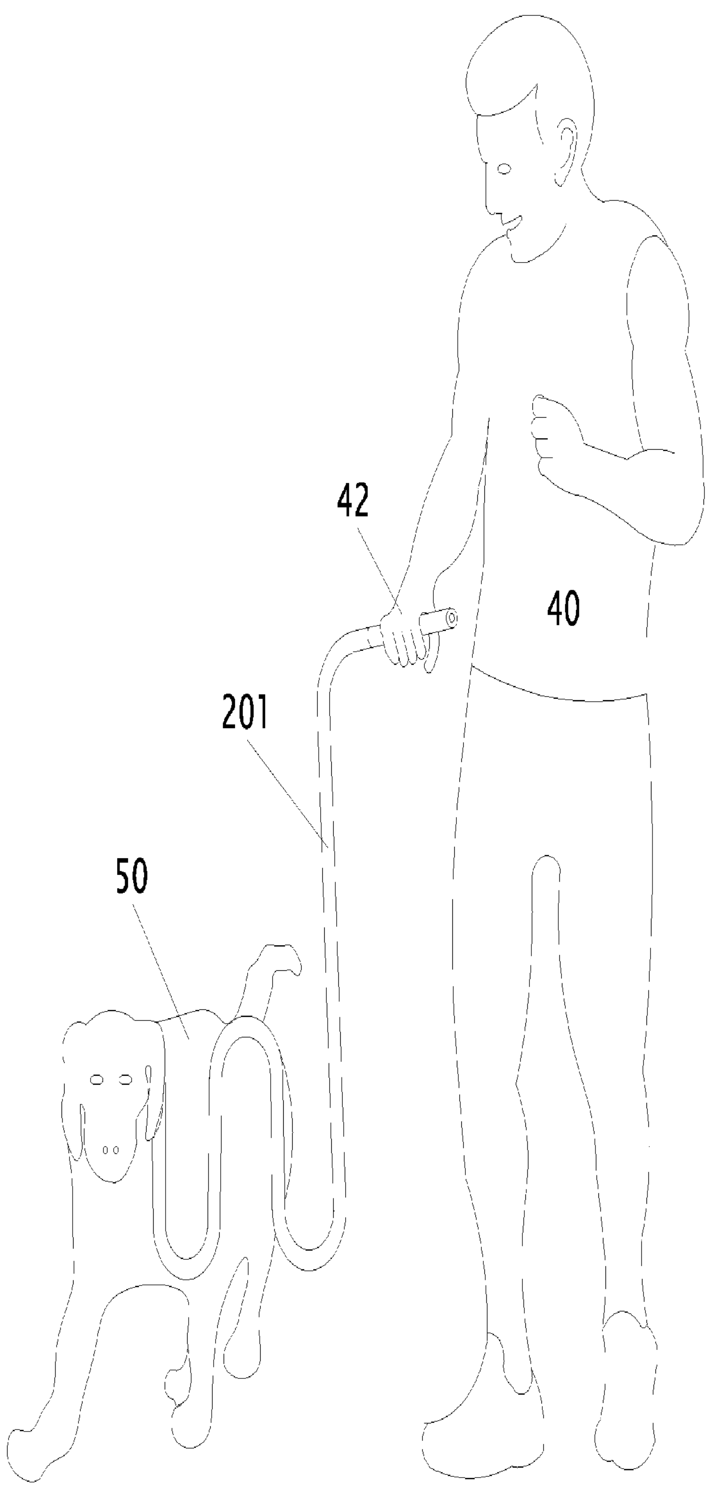
FIG. 3 is a front perspective view of a human walker or jogger with a second embodiment of a dog walking device.

FIG. 3 is a front perspective view of a human walker or jogger 40, a second embodiment of a dog walking device 201 attached to the collar a dog 50. In this example, the frame 210 has a proximal end portion 220 with a rotatable grip 230 and a distal end portion 250 with a collar connection 260.

Figure 4:
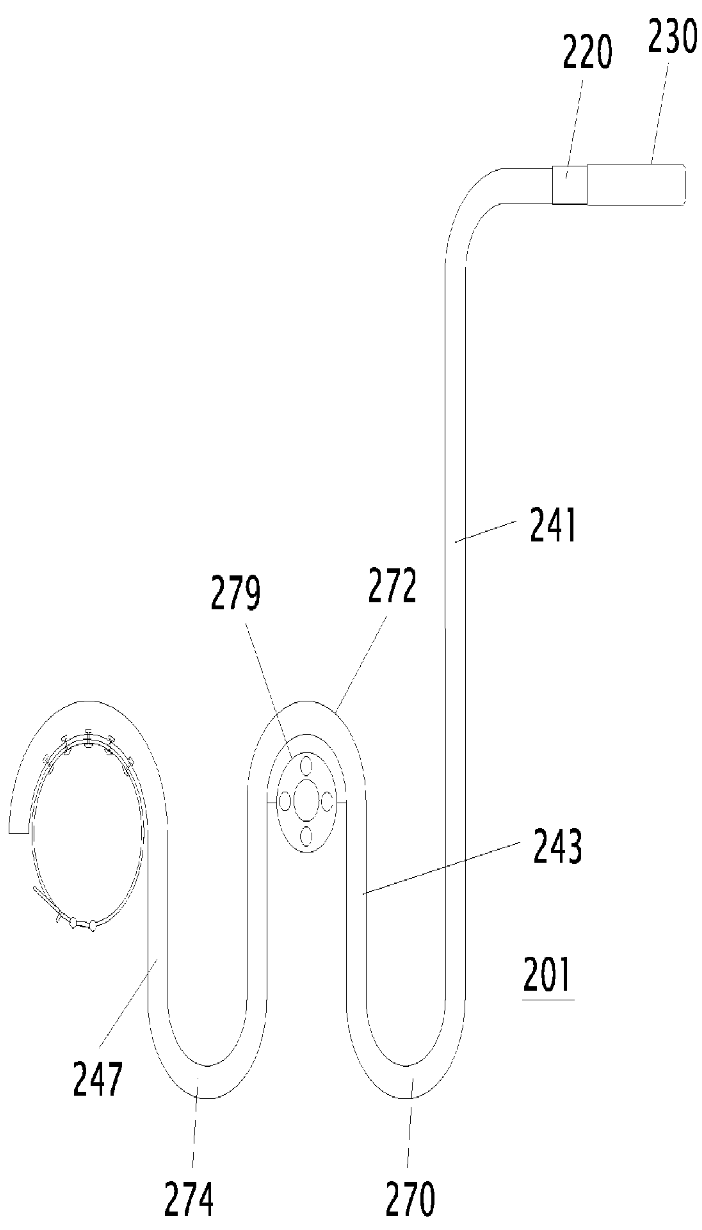
FIG. 4 is a front view of the dog walking device of FIG. 3.

FIG. 4 is a front view of dog walking device 201. In this example, the intermediate frame por tion 240 comprises three U-shaped sections. Proximal U-portion 270 has a vertical section 241, a bend section 242, and a vertical section 243. Inverted U-portion 272 has vertical section 243, a bend section 244, and vertical section 245. Distal U-portion 274 has vertical section 245, a bend section 246, and a vertical section 247. In one example the U-portion and inverted U-portion are provided as semi-rigid polymer tubing. The frame may include one or more lights 279, such as LED lights.

In this example, vertical sections 243, 245, and 247 have approximately the same length, and are shorter than vertical section 241. In other examples, vertical sections 243 and 245 may have a length that is between the length of section 241 and 247.

Figure 5:
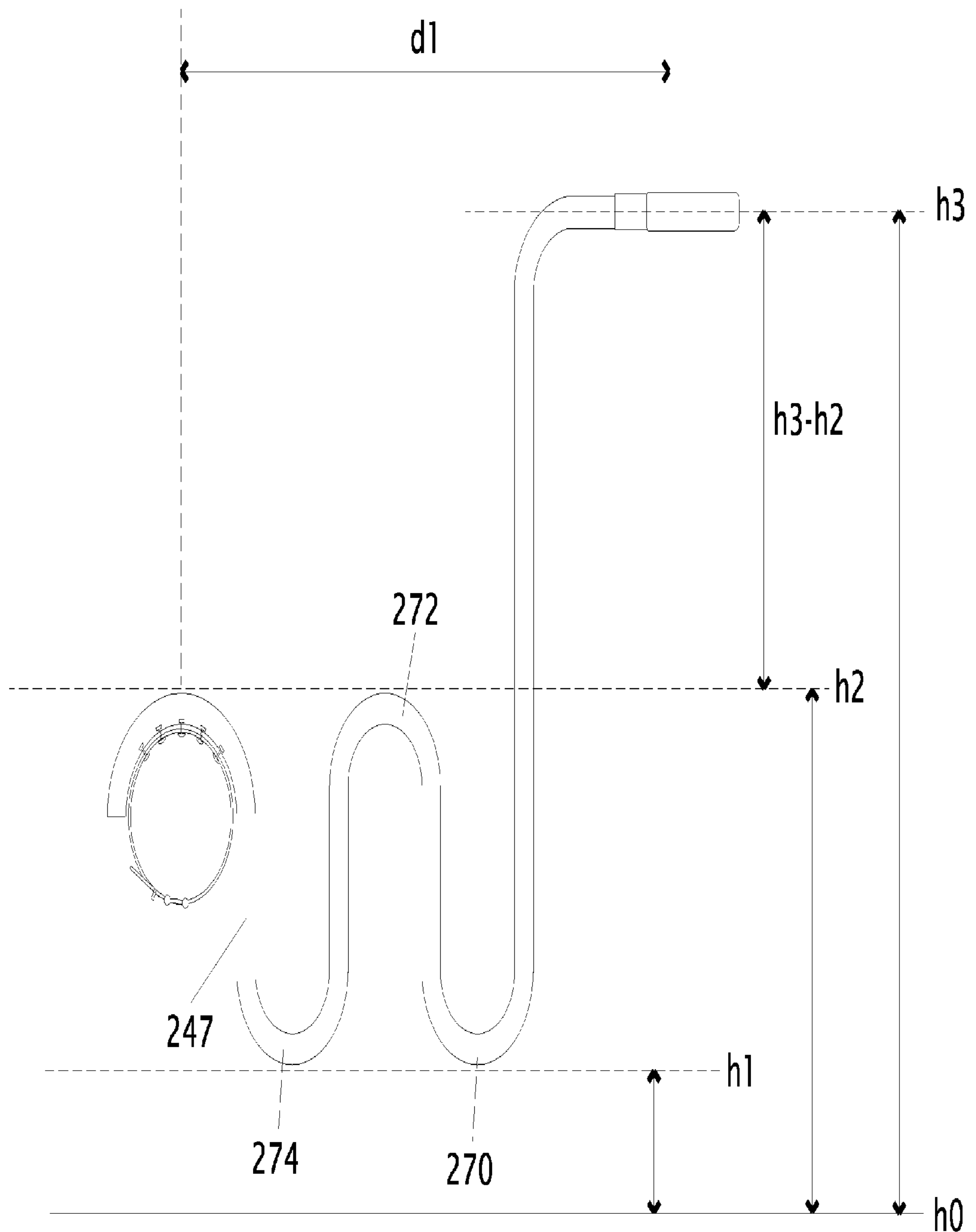
FIG. 5 is a front view of the dog walking device of FIG. 3 showing example heights relative to ground level.

FIG. 5 is a front view of dog walking device 201 showing example heights relative to ground level h0. In this example, the dog neck or top of collar height is shown by h2. The U-shaped sections create and maintain a separation distance d1 between the dog and the hand. In this example, distal U-portion 274 drops to a distance h1 well below the dog shoulder but above ground level h0. Vertical section 274 provides a slight pressure against the dog to maintain a separation distance, and to encourage continued forward alignment versus turning in front of the human. The use of multiple sections that drop below the dog's shoulders reinforces the frame, so that the frame may be constructed of a lightweight material, such as a polymer.

Figure 6A:
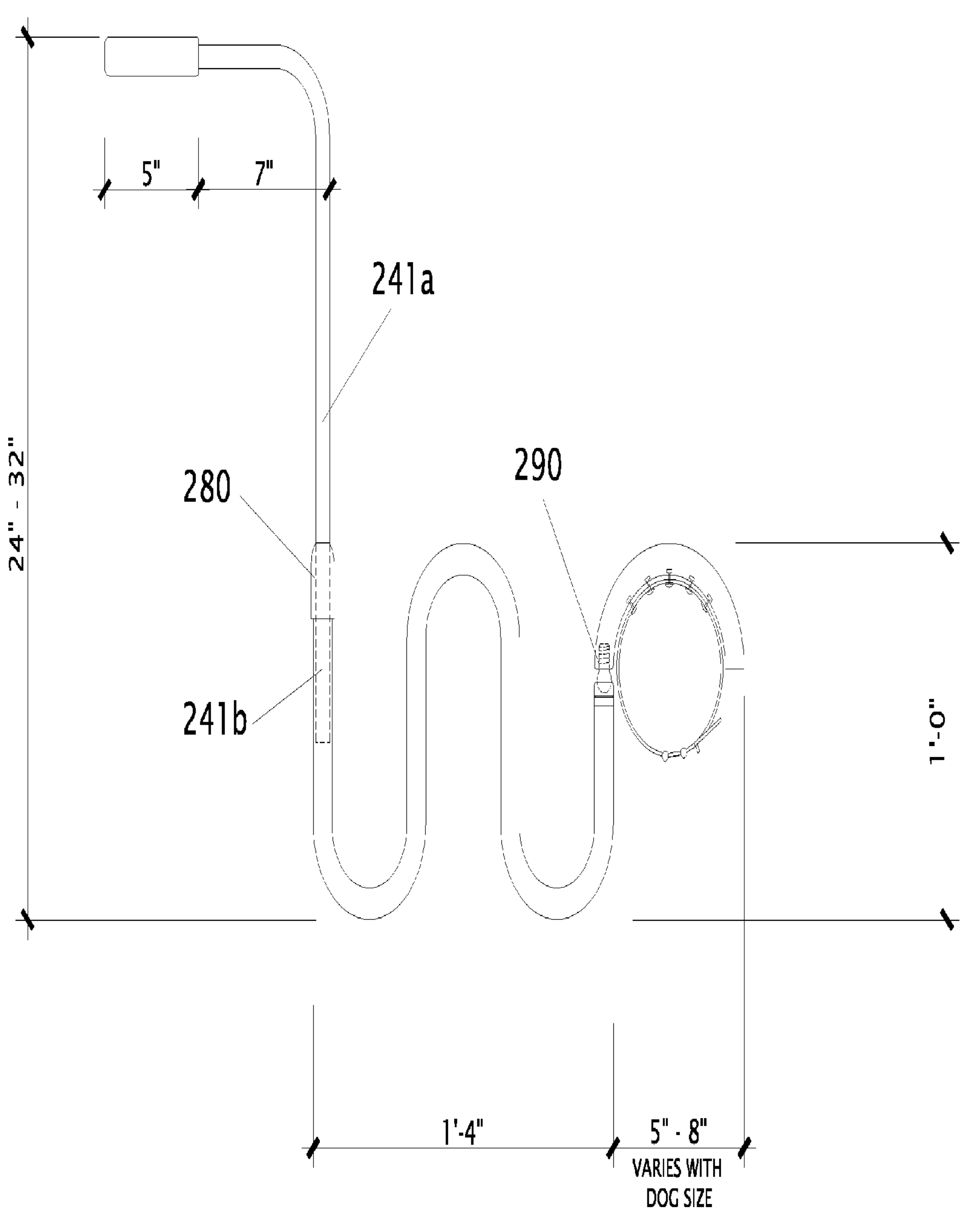
FIG. 6A is a rear view of the dog walking device of FIG. 3 showing a telescopic joint to adjust height, and a ball joint to permit collar movement relative to the dog walking device.
Figure 6B:
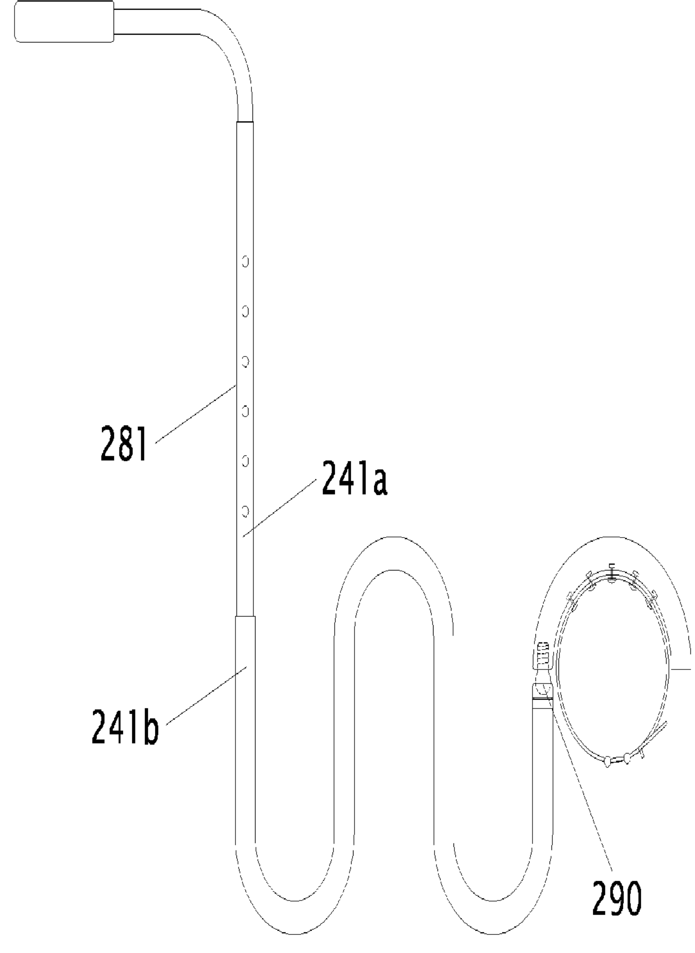
FIG. 6B is a rear view of the dog walking device of FIG. 3 showing a telescopic joint with spring pins.

Device size may be selected based on dog height, and minor height adjustment can be compensated by permitting the device to pivot slightly from vertical, such as by rotation at the hand grip. FIG. 6A is a rear view of the dog walking device of FIG. 3 showing a telescopic joint connector 280 to adjust height. In this example, an upper portion 241*a* of vertical section 241 is constructed of a ½" outer diameter polymer tubing that can slide in or out relative to a lower portion 241*b* which is constructed of a ¾" outer diameter polymer tubing. A comfortable hand height can then be set by tightening telescopic joint connector 280. FIG. 6A also shows a universal ball joint 290 near the distal end portion 250 to permit collar connection 260 movement relative to the dog walking device frame. FIG. 6B is a rear view of the dog walking device of FIG. 3 showing a telescopic joint 281 with spring pins.

Figure 7:
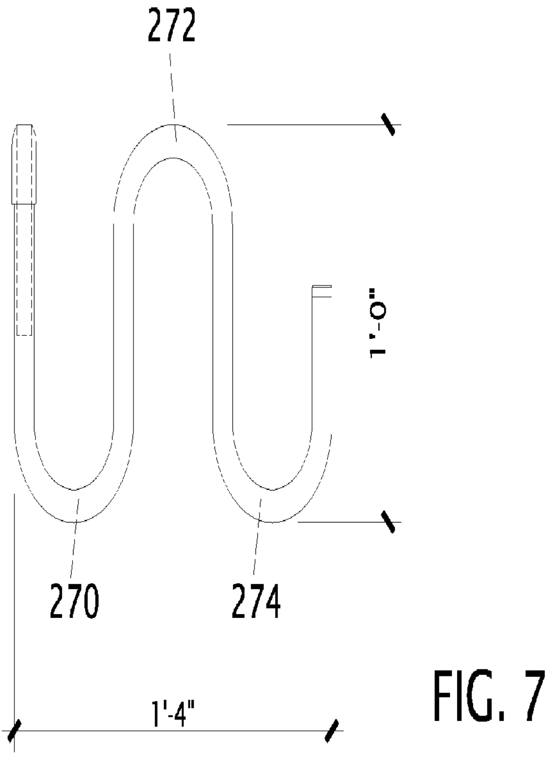
FIG. 7 is a rear view of a portion of the frame of the dog walking device of FIG. 6.

The separation distance can be increased by providing additional U-portions. FIG. 7 is a rear view of a portion of the frame of the dog walking device of FIG. 6 showing a standard size spacer configured for most medium or large dogs. In this example, the three U-portions 270, 272, and 274 each have an internal radius of about 2" to provide total horizontal length of about 16 inches. U-portion 272 has a height of about 12 inches.

Figure 8:
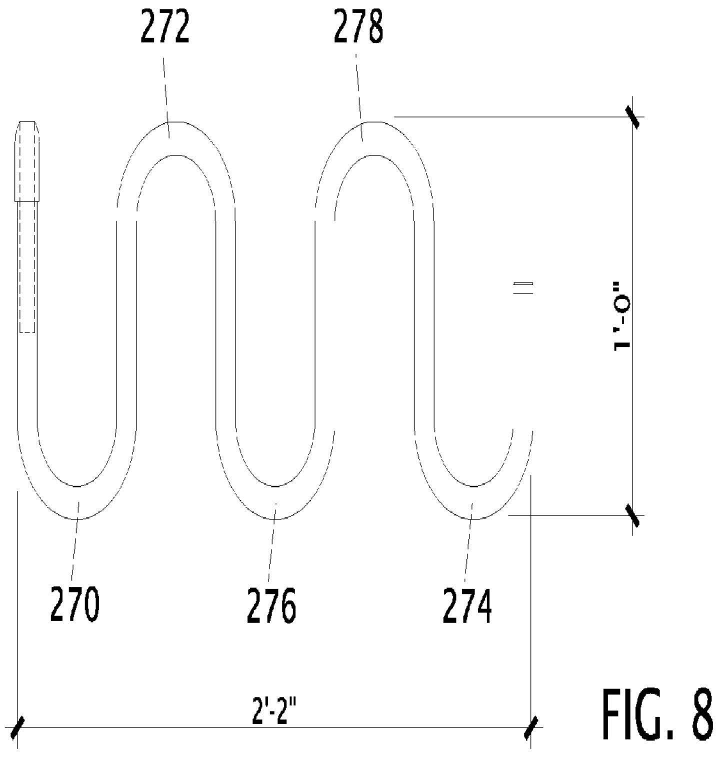
FIG. 8 is a rear view of a portion of the frame of the dog walking device of FIG. 6 showing additional U-portions to provide additional spacing for larger dogs.

FIG. 8 is a rear view of a portion of the frame of the dog walking device of FIG. 6 showing additional U portions 276 and 278 to provide additional horizontal spacing for larger dogs. In this example, the five U-portions 270, 272, 274, 276, and 278 each have an internal radius of about 2" to provide total horizontal length of about 26 inches. In this example, U-portions 272, 276, and 278 each have the same height of about 12 inches. In other examples, the U-portions may have different heights.

Figure 9C:
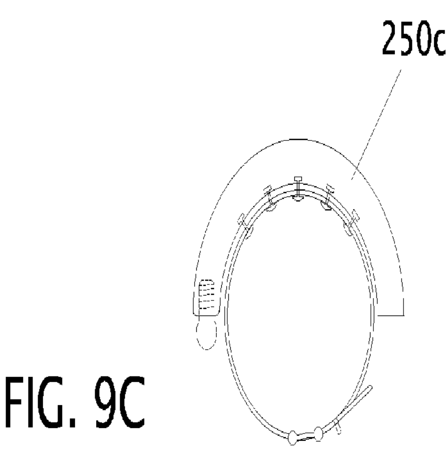
FIG. 9C is a front view of the distal portion of the dog walking device of FIG. 3 configured for the collar of large size dogs.
Figure 9B:
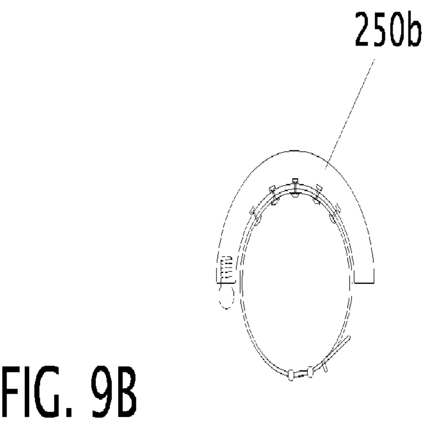
FIG. 9B is a front view of the distal portion of the dog walking device of FIG. 3 configured for the collar of medium to large size dogs.
Figure 9A:
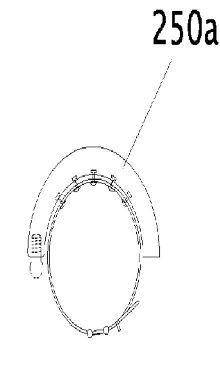
FIG. 9A is a front view of the distal portion of the dog walking device of FIG. 3 configured for the collar of medium size dogs.

The distal end portion 250 may be configured for various size collars. FIG. 9A is a front view of the distal portion 250*a* of the dog walking device of FIG. 3 configured for the collar of medium size dogs with 11 to 15 inch necks. FIG. 9B is a front view of the distal portion 250*b* of the dog walking device of FIG. 3 configured for the collar of medium to large size dogs with 16 to 19 inch necks. FIG. 9C is a front view of the distal portion 250*c* of the dog walking device of FIG. 3 configured for the collar of large size dogs with 20-25 inch necks.

In other examples, a distal end portion may be configured to attach to a harness, such as shown in FIG. 1.

Figure 18:
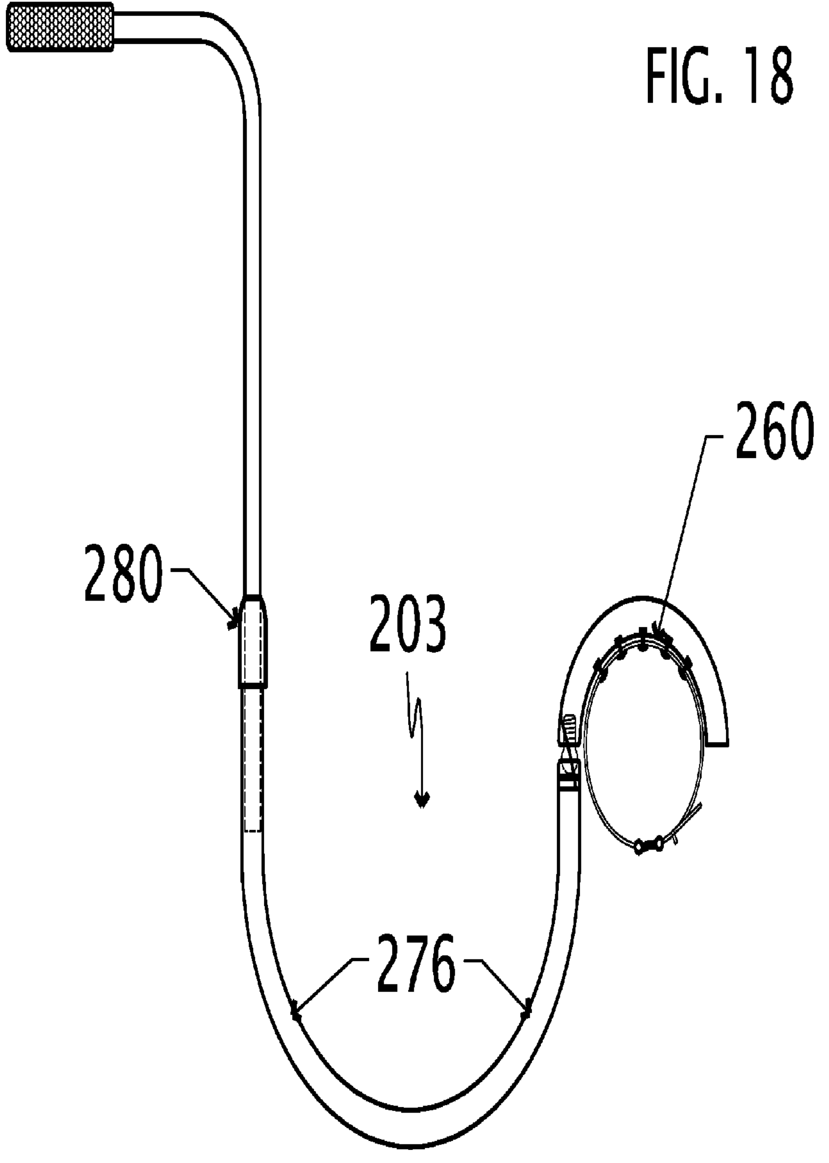
FIG. 18 is a side view of a dog walking device with a single vertically oriented U-shaped intermediate frame section and a collar connection.

FIG. 18 is a side view of a dog walking device 203 comprising a single vertically oriented U shaped intermediate frame section 276 with a collar connection 260. In one example, the intermediate frame section 276 has an internal radius of 7 inches. The radius may be smaller or larger to fit various sizes of dogs.

Figure 19A:
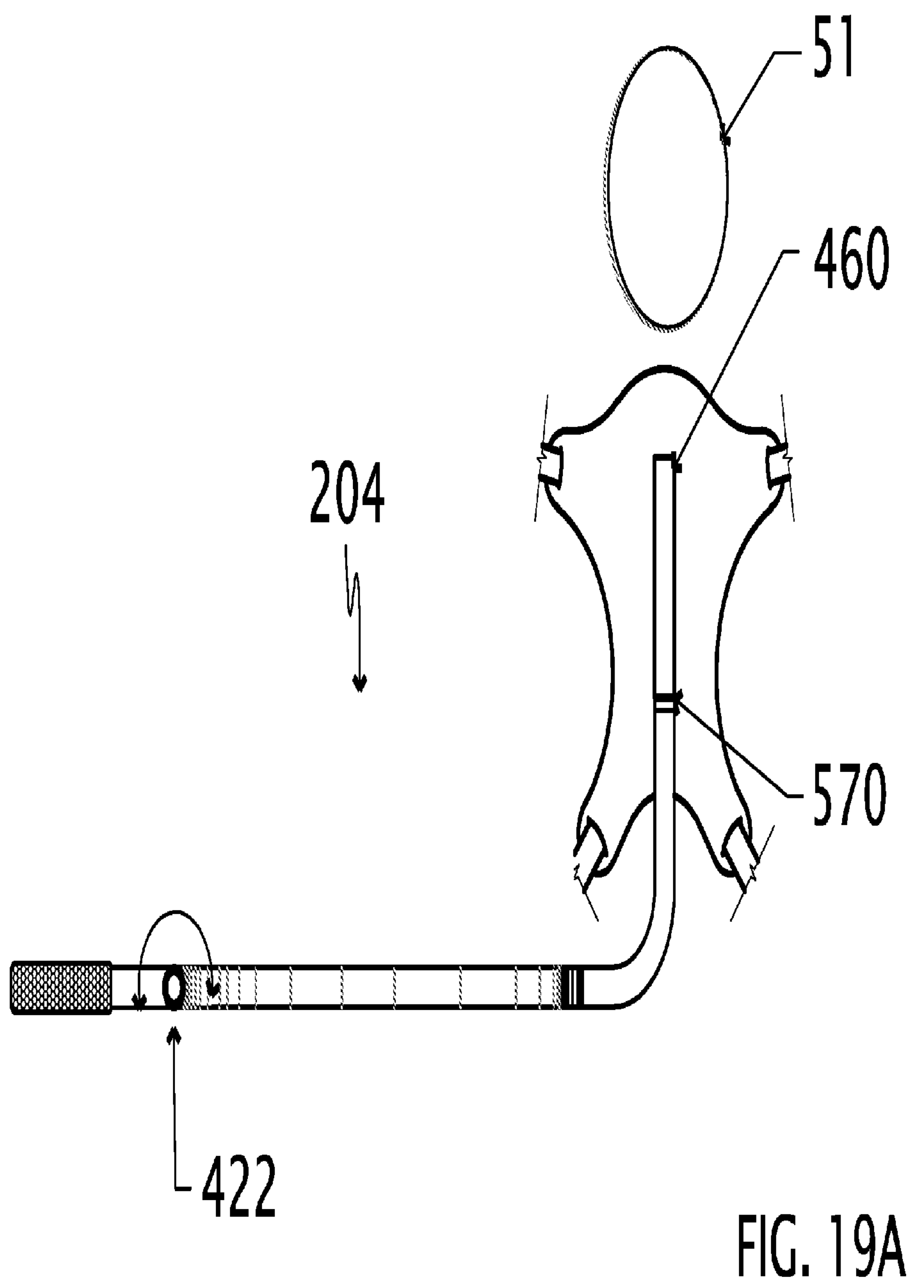
FIG. 19A is a top view of a dog walking device with a single vertically oriented U-shaped intermediate frame section and a harness connection.

FIG. 19A is a top view of a dog walking device 204 with a single vertically oriented U-shaped intermediate frame section and a harness connection 460. FIG. 19B is a side view of the dog walking device 204 of FIG. 19A.

Figure 20A:
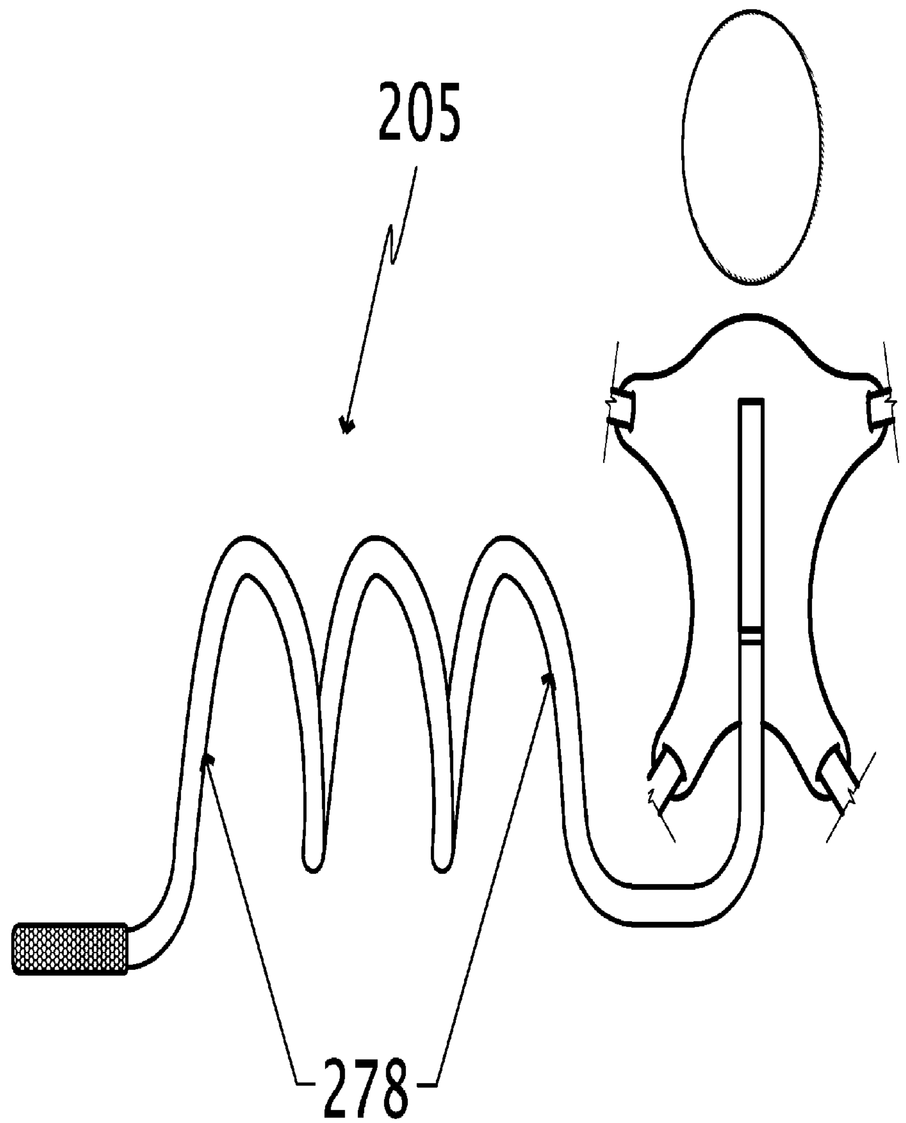
FIG. 20A is a top view of a dog walking device with a spring coil intermediate frame section and a harness connection.
Figure 20B:
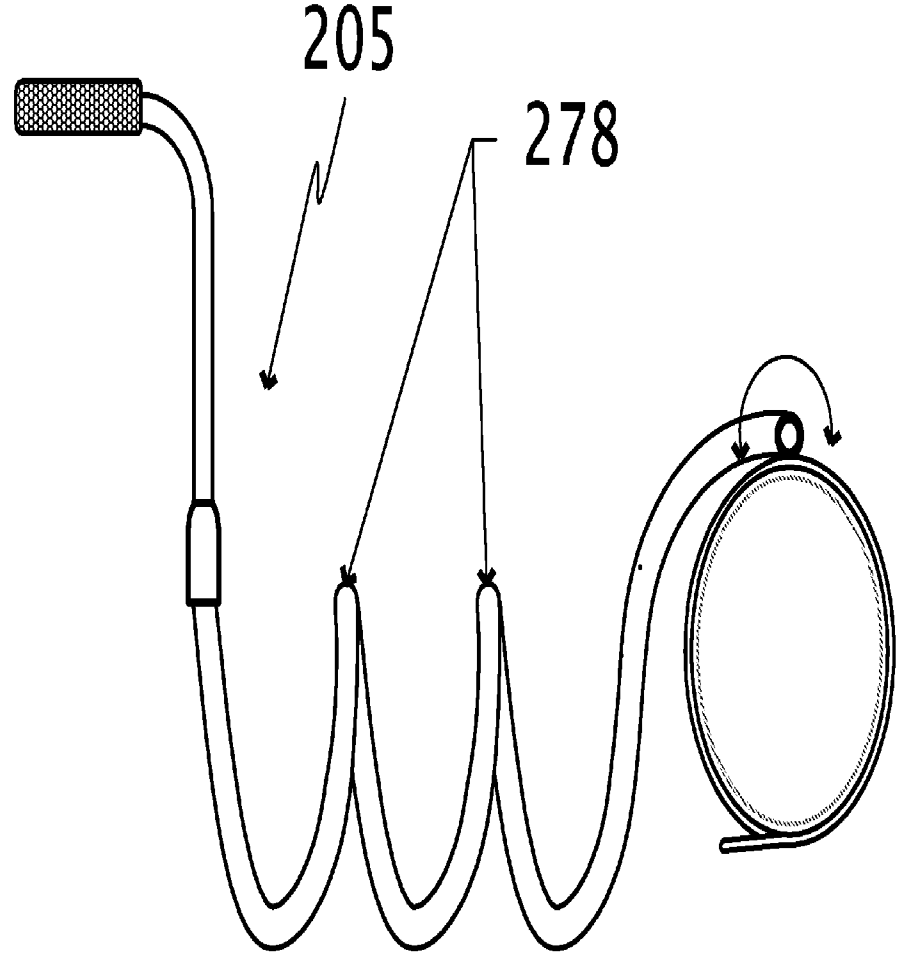
FIG. 20B is a side view of the dog walking device of FIG. 20A.

FIG. 20A is a top view of a dog walking device 205 with a spring coil intermediate frame section 278 and a harness connection. FIG. 20B is a side view of the dog walking device 205 of FIG. 20A. In this example, the spring coil can contract or expand in a vertical or horizontal direction.

Example—Break-Away Collar Section and Safety Cable

In some examples, the collar connection 260 may be detachable from the frame 210.

Figures 10A, 10B, 10C:
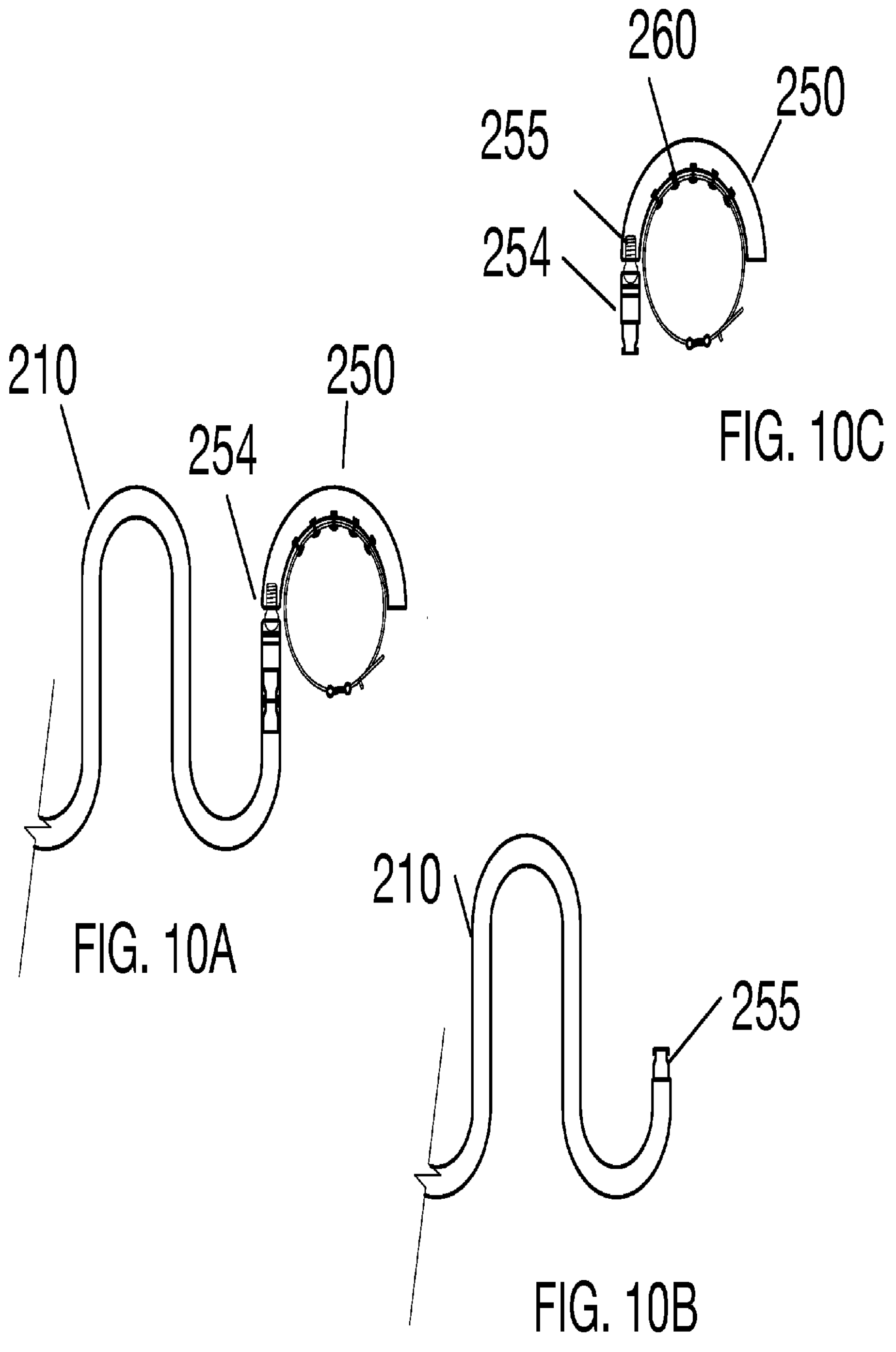
FIG. 10A is a rear view of a portion of the frame of the dog walking device of FIG. 3 with a breakaway coupler in proximity to the collar connector.
FIG. 10B is a rear view of a portion of the distal end portion of FIG. 10A detached from the frame.
FIG. 10C is a rear view of the breakaway coupler and collar connection of FIG. 10A detached from the frame.
Figure 10D:
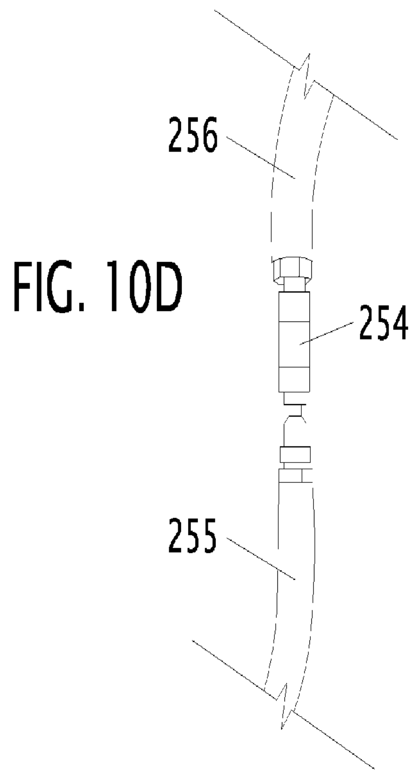
FIG. 10D is a detail of the breakaway coupler of FIG. 10A.
Figure 10E:
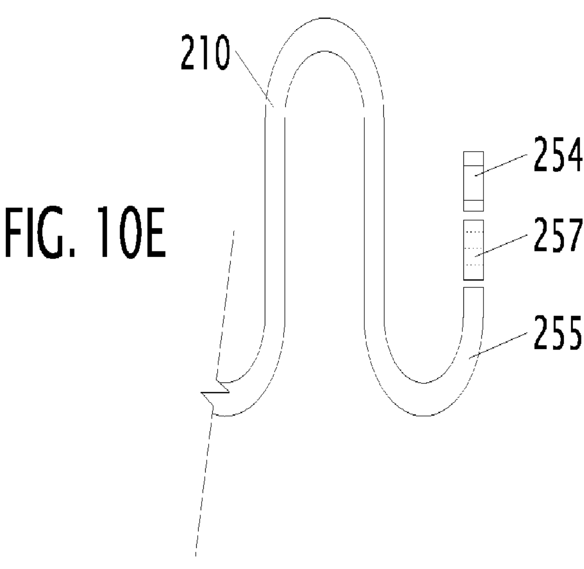
FIG. 10E is a detail exploded view of the breakaway coupler of FIG. 10A.

FIG. 10A is a rear view of a portion of the frame 210 of the dog walking device of FIG. 3 with a breakaway coupler 254 in proximity to the collar connector. FIG. 10D is a detail of the break away coupler of FIG. 10A showing the breakaway coupler connecting frame section 255 to collar connection section 256. FIG. 10B is a rear view of the distal end portion 250 of FIG. 10A detached from the frame 210. FIG. 10C is a rear view of the breakaway coupler 254 and collar connection 260 of FIG. 10A detached from the frame 210. FIG. 10E is a detail exploded view of the breakaway coupler 254 attached to nipple 257 which is attached to frame section 255.

Figure 11:
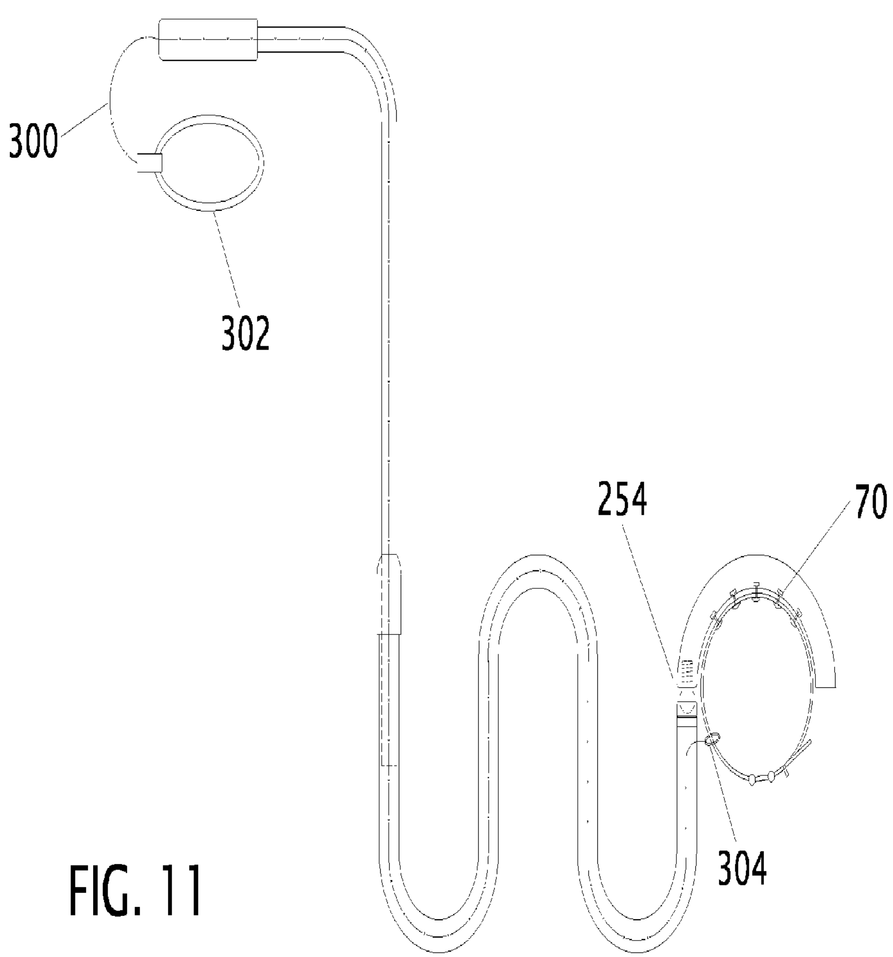
FIG. 11 is a front view of a safety cable routed through the frame of FIG. 10A.

FIG. 11 is a front view of a safety cable 300 routed through the frame of FIG. 10A and connected to collar 70 with connector 304. A wrist strap 302 is provided on the proximal end of the cable.

Example—Combination Vertical and Horizontal Handle

Figure 12:
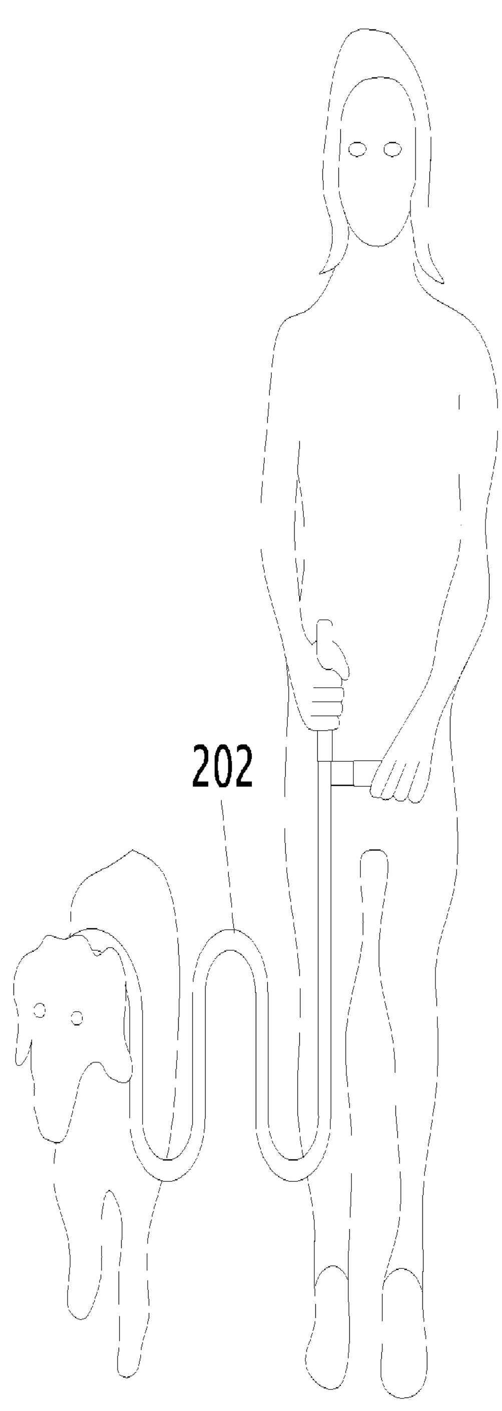
FIG. 12 is a front perspective view of a human walker or jogger and an example of a dog walking device with a combination handle.
Figure 13:
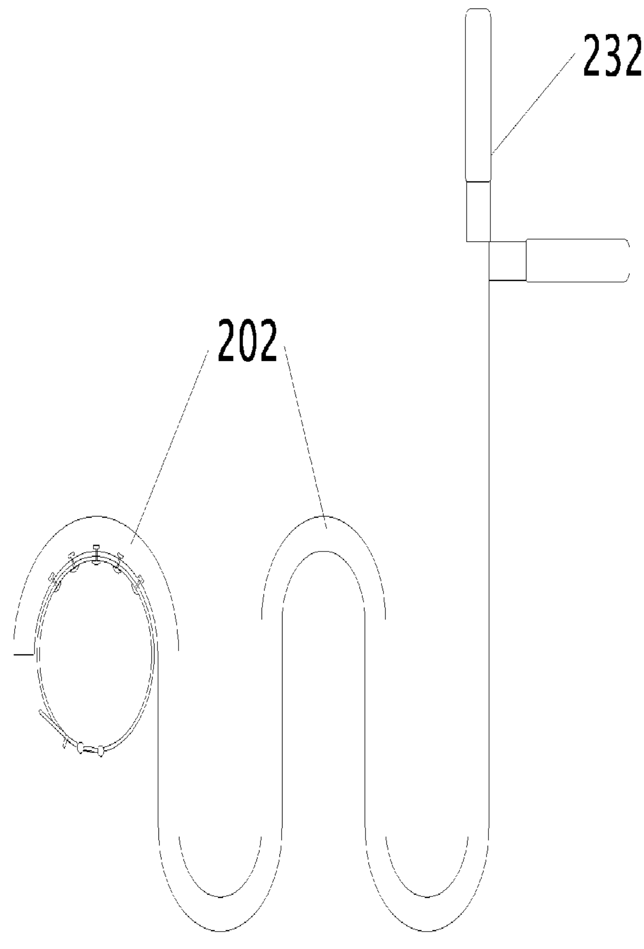
FIG. 13 is a front view of the dog walking device of FIG. 12.

FIG. 12 is a front perspective view of a human walker or jogger and an example of a dog walk ing device 202 with a combination handle 232. FIG. 13 is a front view of the dog walking device 202 of FIG. 12.

Example—Belt Assembly

Figure 14:
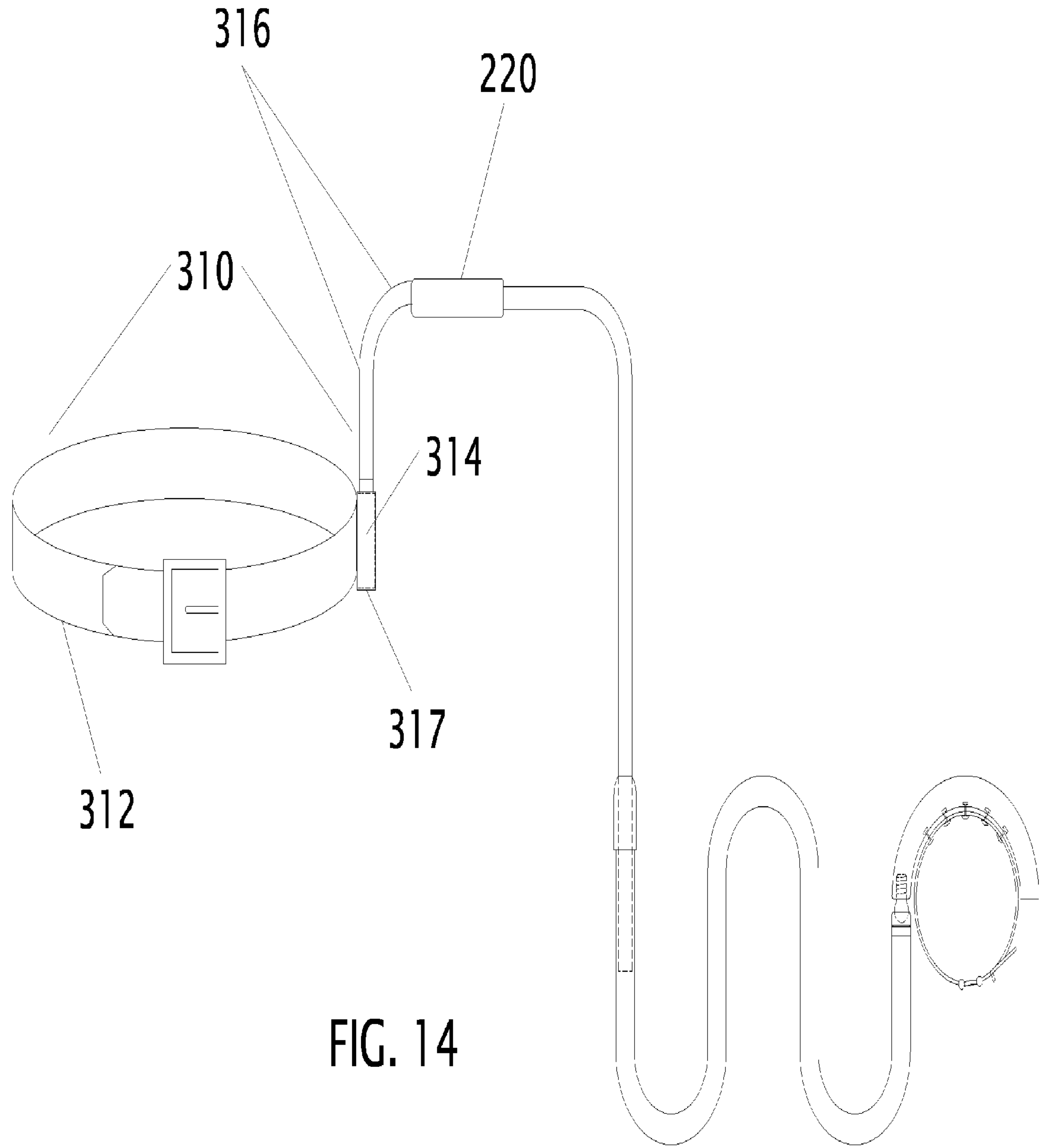
FIG. 14 is a rear view of the frame of FIG. 10A with a belt assembly.

FIG. 14 is a rear view of the frame of FIG. 10A with a belt assembly 310. In this example, the belt assembly has an extension 316 from the proximal end portion 220 of the frame. In this example, a rotating joint 314 and connector 317 attaches the belt 312 to the extension 316. The connector 317 may be a I" diameter rigid tubing with bearing rollers. The belt can be adjusted with buckle 313.

Example—Horizontal U-Portions with Longitudinal Harness Connection

Figure 15A:
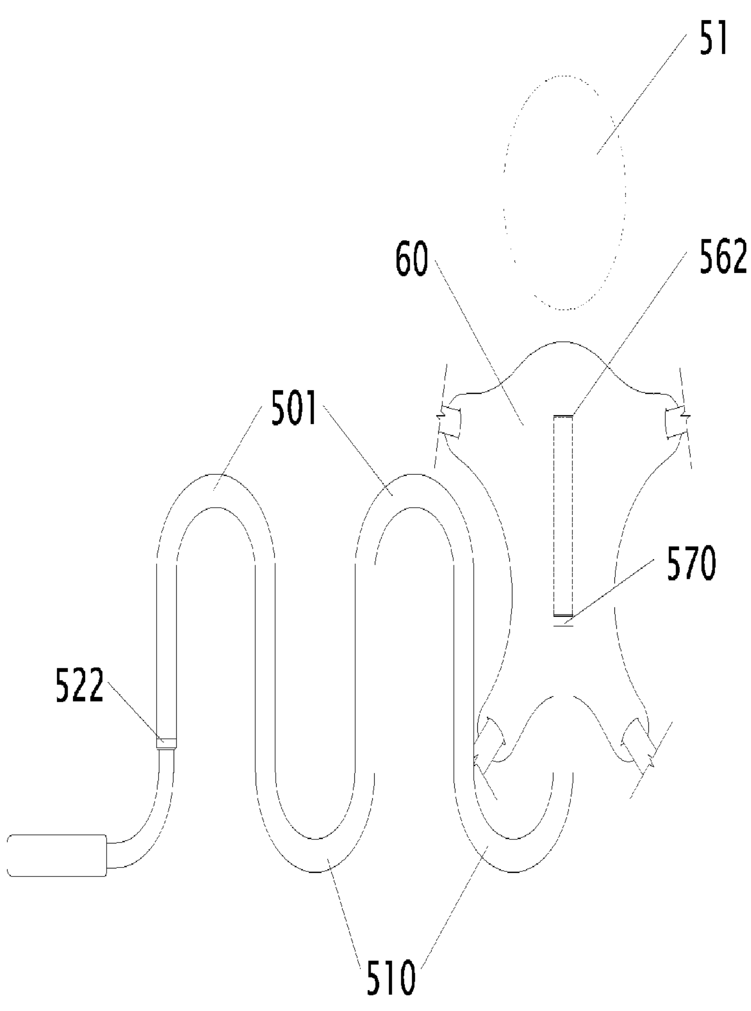
FIG. 15A is a top view of a dog walking showing a harness and a longitudinal harness connection.
Figure 15B:
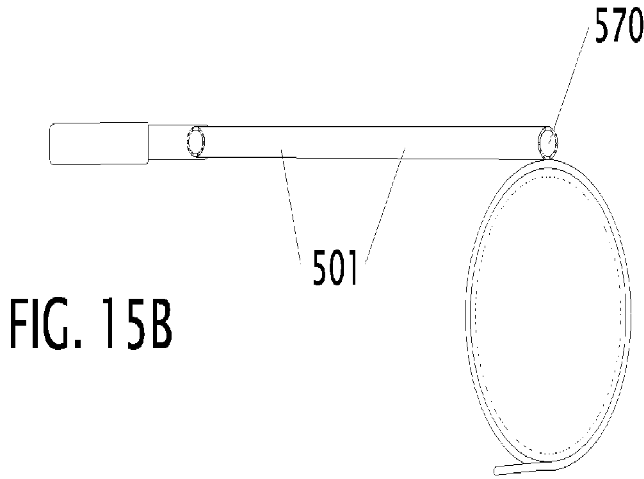
FIG. 15B is a side view of the dog walking device and harness connection of FIG. ISA
Figure 15C:
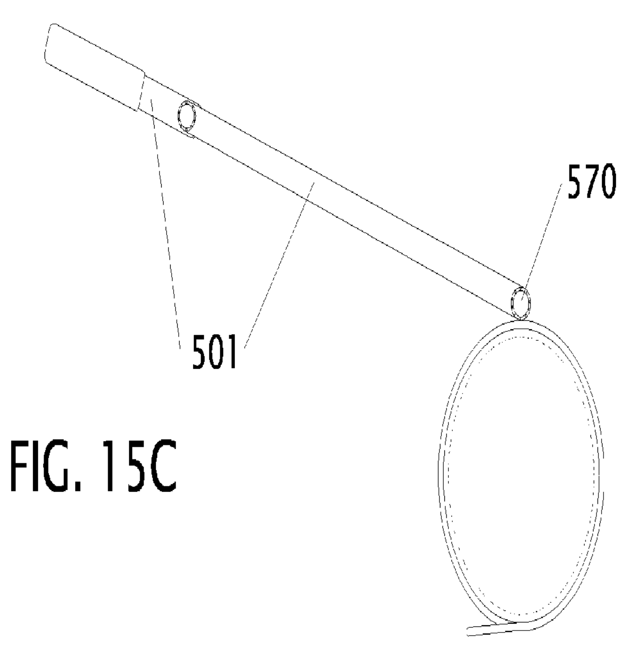
FIG. 15C is a side view of the dog walking device and harness connection of FIG. 15B partially rotated with respect to the harness.

In this example, the U-portions of the dog walking device frame are oriented horizontally or at an angle to the horizontal plane, rather than vertically as shown in the previous examples. In this example, a harness connection is provided on a dog walking device. FIG. 15A is a top view of the dog walking device 501 showing a harness 60. A section 562 of rigid tubing with bearing rollers is attached to the harness in parallel to the longitudinal axis of the dog. The harness connection includes a rotational joint 570. FIG. 15B is a side view of the dog walking device 501. FIG. 15C is a side view of the dog walking device 501 partially rotated with respect to the har ness. The longitudinal harness connection provides additional guidance in aligning the dog's motion in a desired direction.

Example—Longitudinal Harness Spacer

Figure 16:
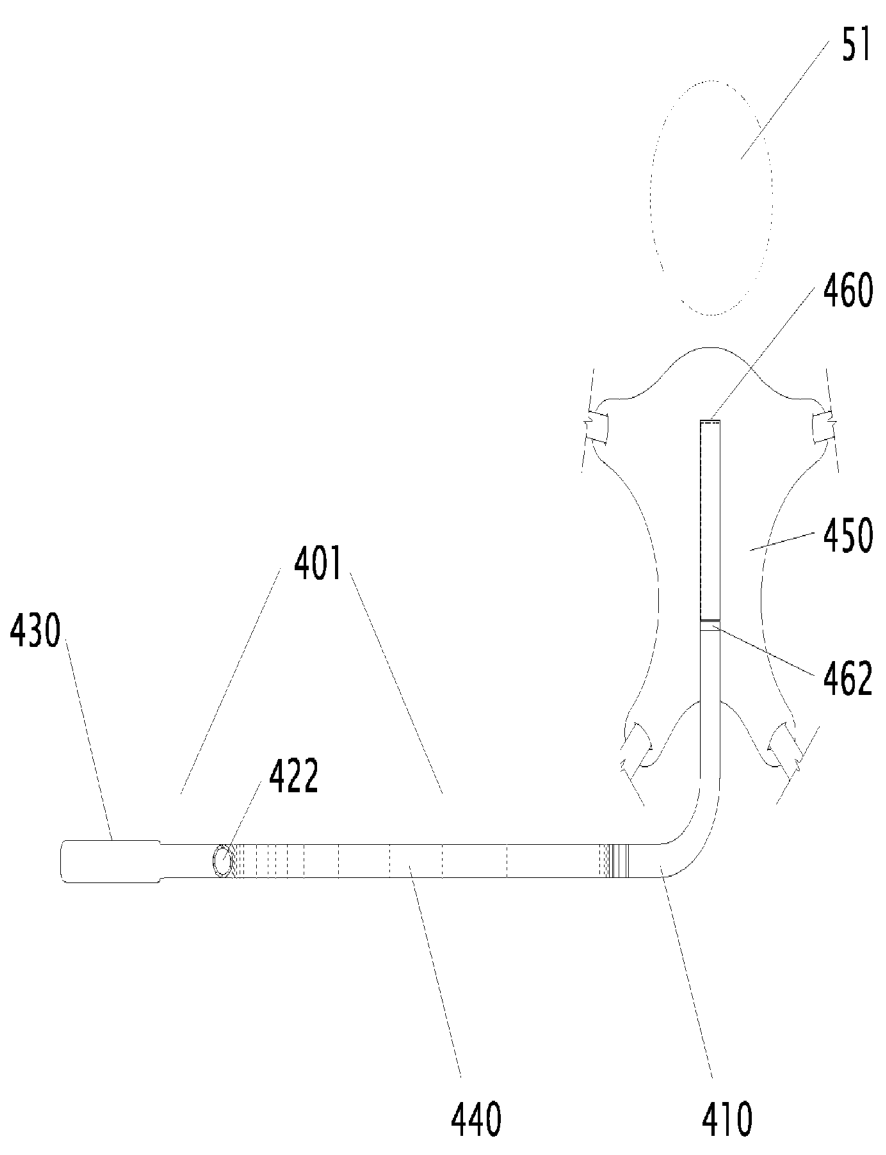
FIG. 16 is a top view of another example of a dog walking device.

FIG. 16 is a top view of another example of a dog walking device 401 where the intermediate frame section 440 comprises vertically-oriented U-shape and inverted U-shape elements. In this example, the intermediate frame 440 is formed of a rigid polymer or metal tubing. A first rotational joint 422 connects the proximal end portion 420 of the frame to the trapezoidal intermediate frame 440. A rotational joint 462 is provided on the longitudinal harness connector 460.

Example—Trapezoidal Harness Connector Assembly

Figure 17A:
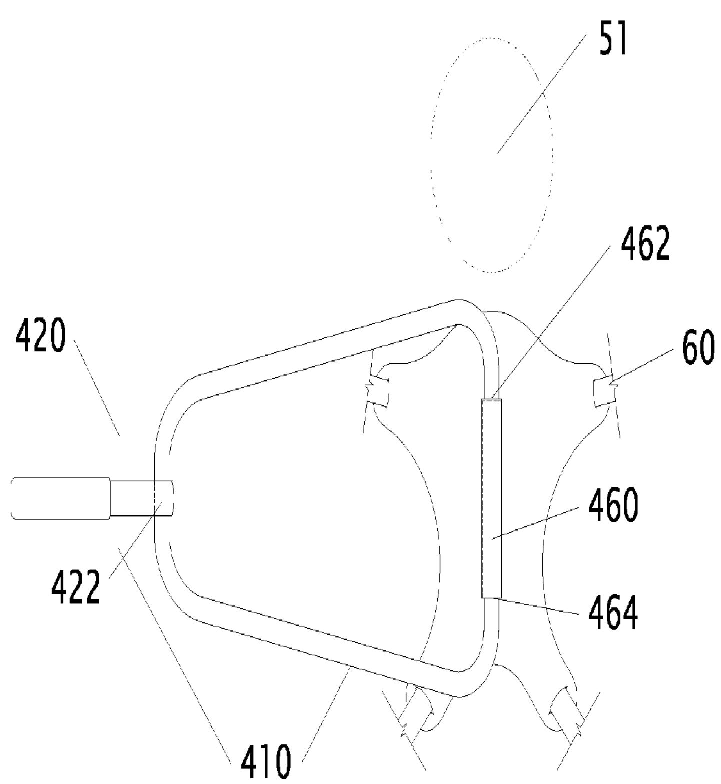
FIG. 17A is a top view of trapezoidal harness connector assembly.
Figure 17B:
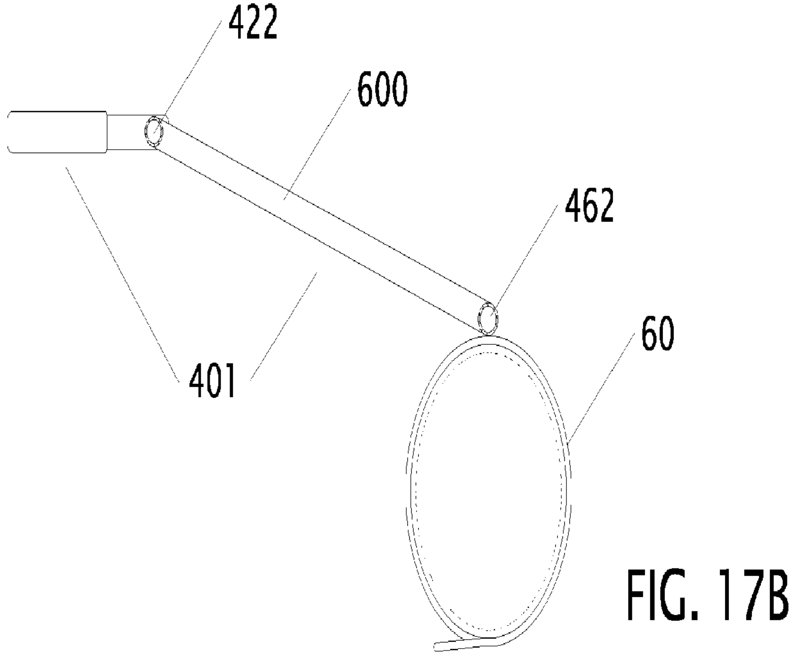
FIG. 17B is a side view of the trapezoidal harness connector assembly of FIG. 17A

FIG. 17A is a top view of trapezoidal harness connector assembly. FIG. 17A is a top view of trapezoidal harness connector assembly. FIG. 17B is a side view of the trapezoidal harness connector assembly of FIG. 17A In this example, the intermediate frame section is a trapezoidal frame 600 which is pivotally connected to the harness connector 460 and the proximal end portion 420.

Example—Top-Mount Assembly for Small Dogs

Figures 21, 22:
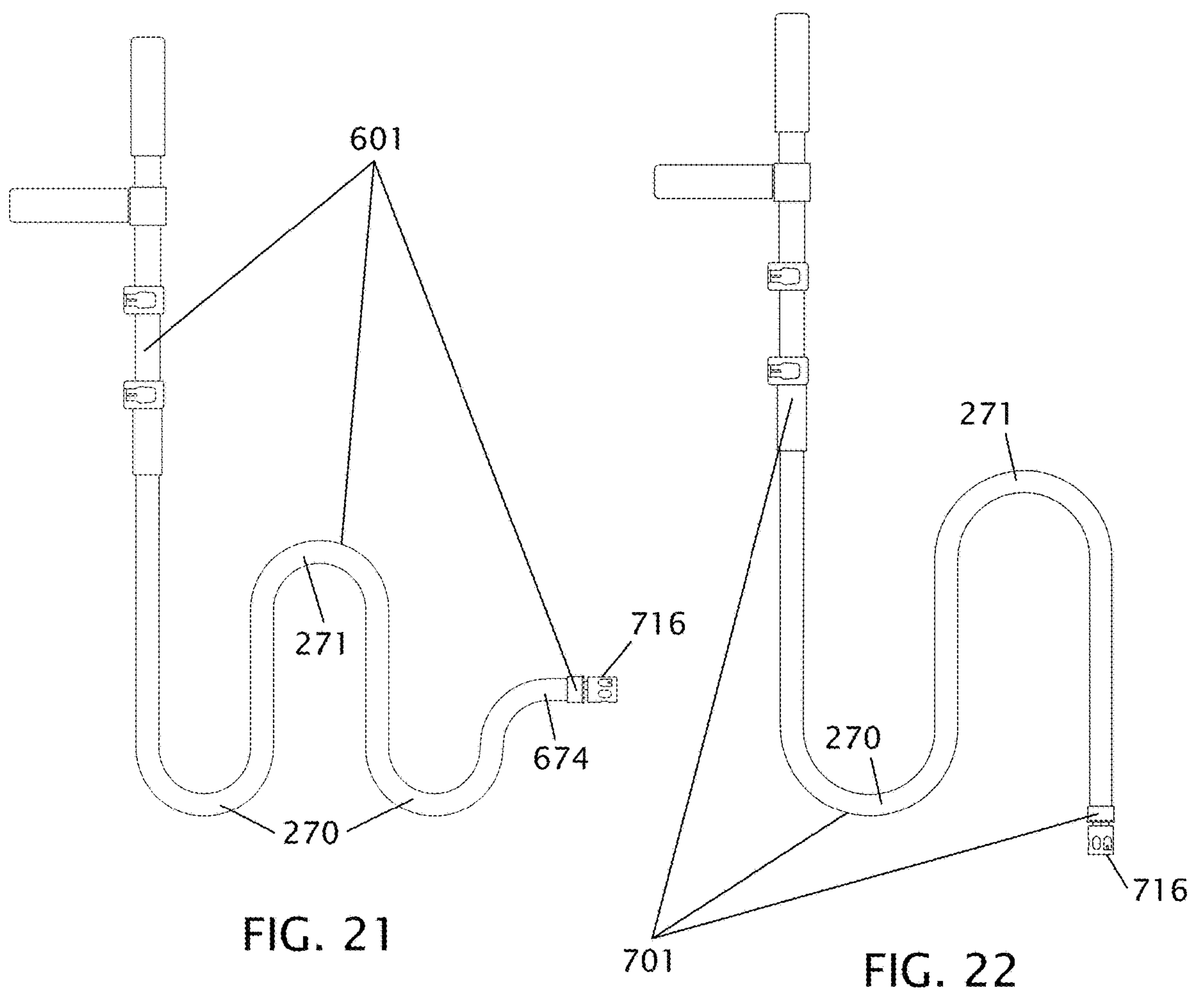
FIG. 21 is a side view of an embodiment of a dog walking device with a side mount spacer coil frame.
FIG. 22 is a side view of an embodiment of a top mount spacer coil frame assembly.

FIG. 22 is a side view of a top mount spacer coil frame assembly 701.

Figures 26A, 26B:
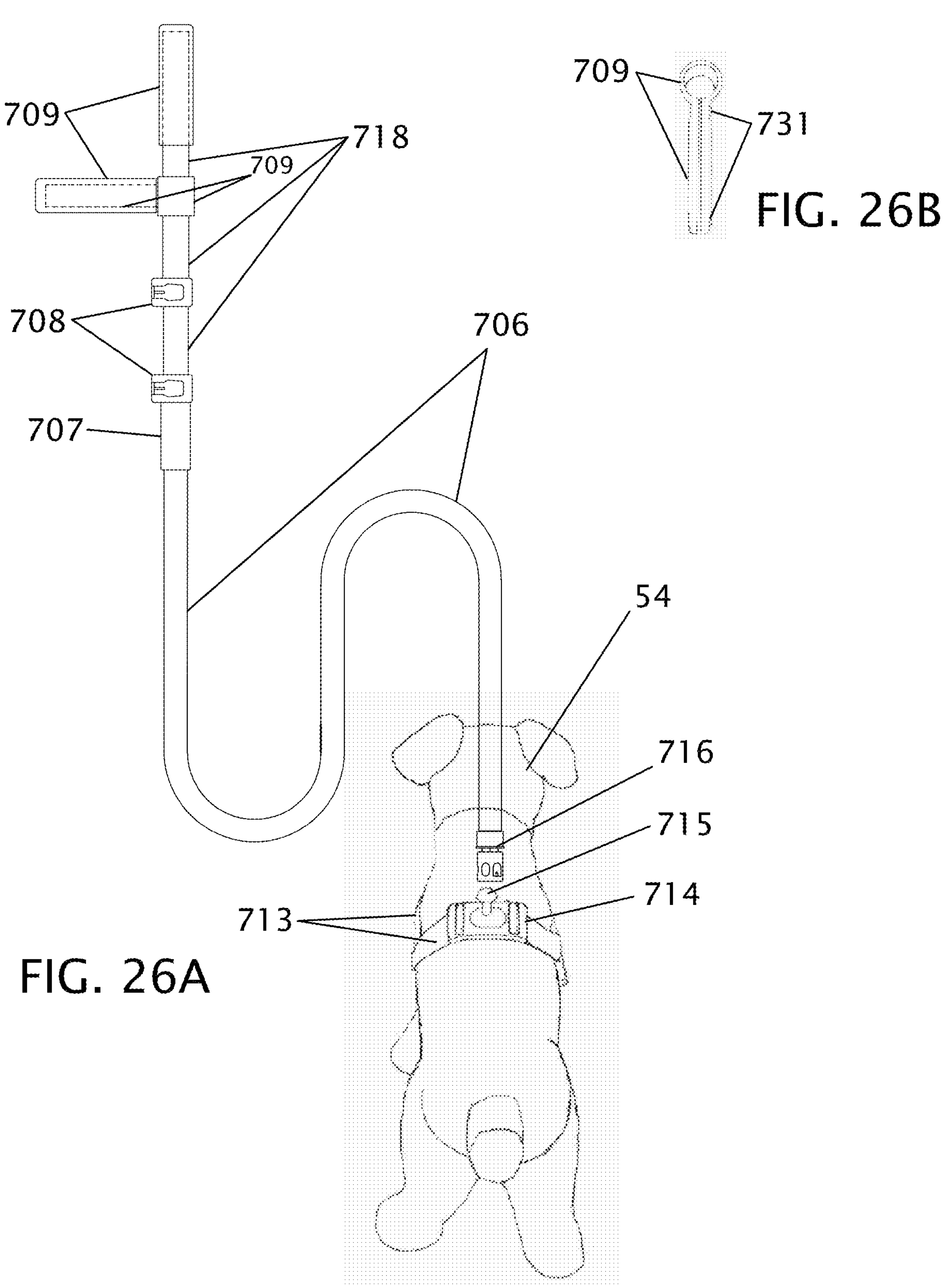
FIG. 26A is a top perspective view of a dog walking device with a top mount attachment to a dog harness and dog.
FIG. 26B is a detailed top view of a horizontal handle stem and attachment ring of FIG. 26A.

FIG. 26A is a top perspective view of a dog walking device with a top mount spacer coil frame 706 attached to an adjustable, no pull strap harness 713 with a 2 inch top strap dog harness worn by a small dog 54.

Figure 26C:
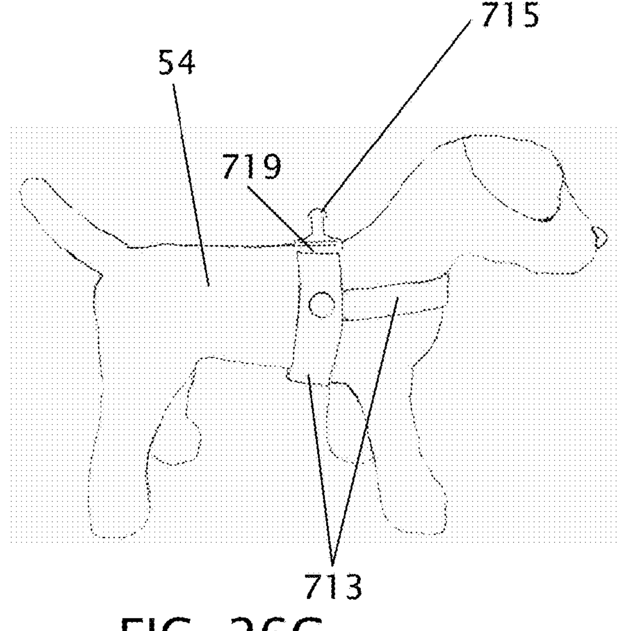
FIG. 26C is a side view of the dog harness and dog of FIG. 26A.

FIG. 26C is a side view of the dog harness and dog of FIG. 26A. In this example, a female quick-connect coupler element 716 on the distal end of the top mount spacer coil frame 706 is oriented so that it can mate with a male coupler 715 attached to a harness. The top mount connection is best suited for small dogs weighing 25 pounds or less.

In this example, the top mount spacer coil frame 706 comprises a proximal U frame section 270 and an inverted U frame section 272.

In this example, a handle coupler 707 connects the top mount spacer coil frame 706 to an adjustable handle assembly 711. The adjustable handle assembly has a vertical handle 718 and a horizontal handle 709. The vertical and horizontal handles have rubber bicycle grips 710.

Locking tabs 708 release to allow the handle length to be adjusted in the range of 15 inches to 32 inches.

FIG. 26B is a detailed top view of a horizontal handle stem 709 and handle attachment ring 731. The attachment ring comprises a bolt and nut to mount the attachment ring to clamp to the vertical handle 718.

Figure 27B:
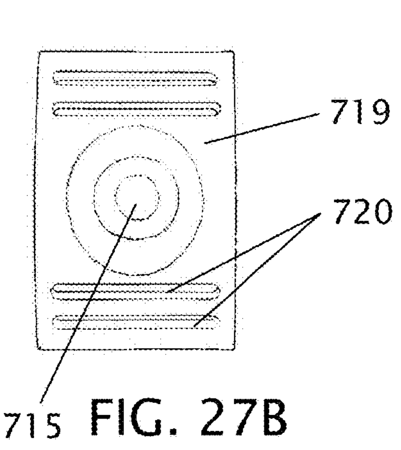
FIG. 27B is a top view of the single-strap buckle connector of FIG. 27A.
Figure 27A:
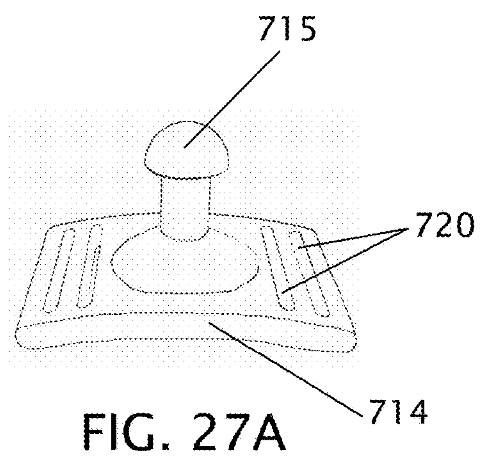
FIG. 27A is a side perspective view of a single-strap buckle connector.

FIG. 27A is a side perspective view of a single-strap buckle connector 714. FIG. 27B is a top view of the single-strap buckle connector of FIG. 27A.

In this example, the single-strap buckle connector 714 has a male coupler 715 projecting upward from a connector base 719. The connector base 719 has slots 720 for attachment to an adjustable, no pull strap harness 713.

Example—Side-Mount Attachment Frame

FIG. 21 is a side view of an embodiment of a dog walking device with a side mount attachment frame 601. In this example, the top mount spacer coil frame 706 comprises a proximal U frame section 270, an inverted U frame section 272, and a distal U frame section 274 with horizontal extension 674. A female coupler 716 is positioned on the distal end of the spacer coil frame.

This example side mount attachment frame has an adjustable handle assembly, a lateral distance spacer-coil, and a quick-connect female. Side-mount control is applicable to medium-sized dogs in the range of 25-60 pounds. Three examples of side-mount control connection are described below—quick connect assembly, enhanced quick connect assembly, and threaded housing assembly.

Quick Connection Assembly with Hemispherical Male Connector

Figures 35A, 35B, 35C, 35D, 35E:
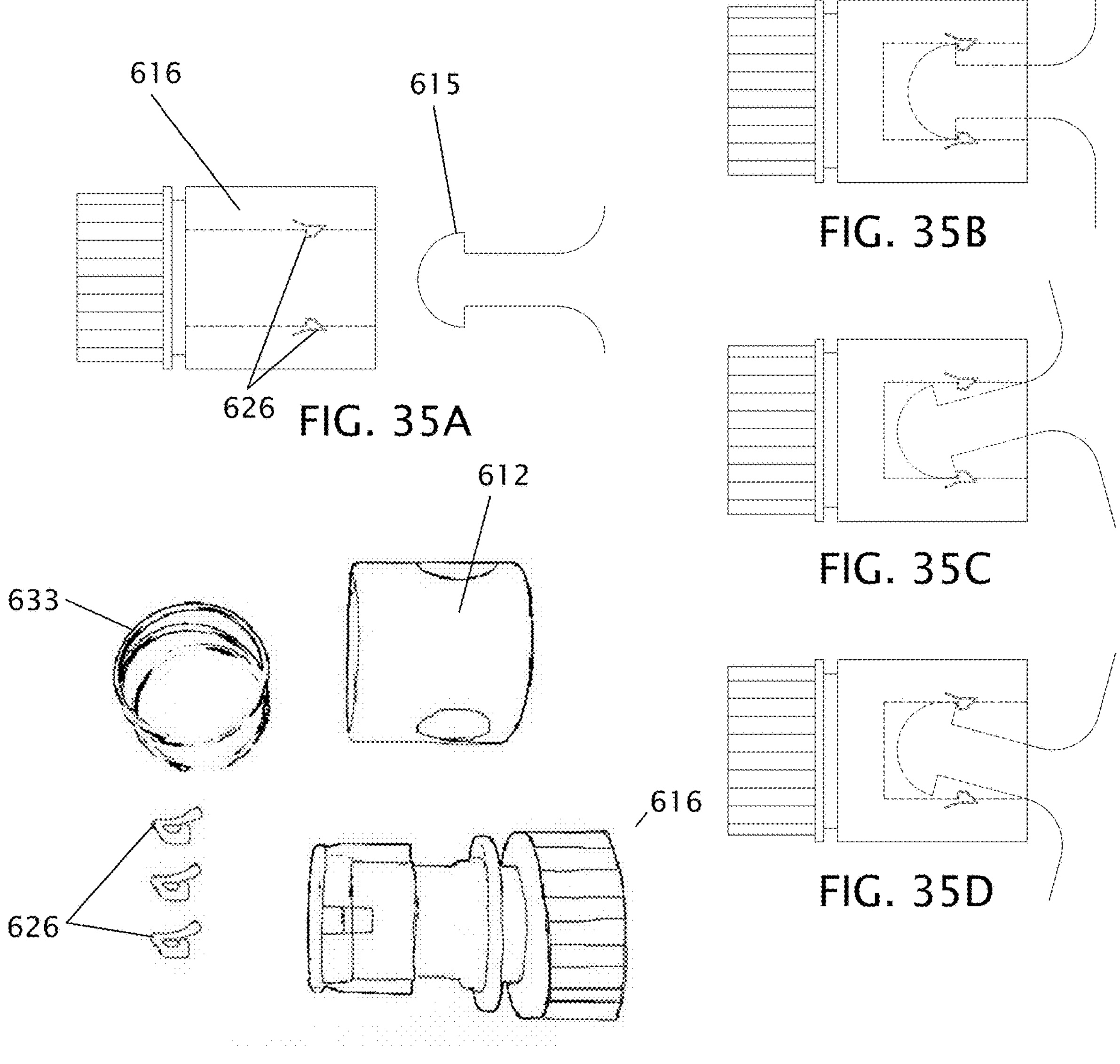
FIG. 35A is a cross-section side view of a quick connection assembly with a hemispherical male connector.
FIGS. 35B, 35C, and 35D are cross section side views illustrating the range of alignment of the male portion relative to the female portion of the quick-connection assembly of FIG. 35A.
FIG. 35E shows the components of the quick-connect female connector of FIG. 35A.

FIG. 35A is a cross-section side view of a quick connection assembly 630 with a hemispherical male connector 615 on stem 660 positioned for insertion into a female connector 616. FIGS. 35B, 35C, and 35D are cross section side views illustrating the range of alignment of the male connector 615 relative to the female connector 612 of the quick-connection assembly of FIG. 35A.

A pivot angle of 20 degrees is preferable to allow some movement flexibility and this point of connection. Too small of a pivot angle will create too rigid of a connection point leading to undue stress on other components and too large of a pivot angle will result in loss of control and ability to correct nonparallel and nonlinear pathway movements by the dog. The 20-degree pivot angle is omnidirectional providing a proper balance of control and movement flexibility.

FIG. 35E shows the components of the quick-connect female connector 616 of FIG. 35A. In this example, three catch tabs 626 are positioned in a slotted internal cylinder 633. A spring-loaded outer cylinder 612 slides over the internal cylinder 633 and snaps into place with the catch tabs.

Pushing the spring-loaded outer cylinder towards the female threaded connector releases the catch tabs 626 and allows the male connector 615 to move into or out of the female connector 630. If the male connector is inside the female connector and the outer cylinder is released and springs back into the locking position, the male connector is secured and the desired point of connection between dog and human is established. The diameter of the half sphere maximum diameter coincides with the catch tabs 626 spacing inside the hollow female connector.

In this example, the female connector has internal threads on its proximal end 631 to permit the housing to be threaded onto the distal end of a spacer coil frame. In other examples, the cylindrical housing may be glued or otherwise attached to the coil spacer frame.

In one example, the quick-connect female connector 612 is the female portion of a garden hose repair coupler. The male portion of the coupler is replaced with the hemispherical male connector 615 designed to fit with the catch tabs 626. This combination provides an unexpected strength of connection if the diameter of the male connecter is within the range of 17.02 to 17.04 mm.

The connection point of the frame to a harness or collar is the most critical interface between dog and human. The connections and disconnections between the male connector 615 and the female connector 630 are accomplished quickly and with connector is a half-sphere with stem 660 attached to a harness or collar.

Example—Side-Mount Attachment Frame with Quick Connect Assembly

Figures 23A, 23B:
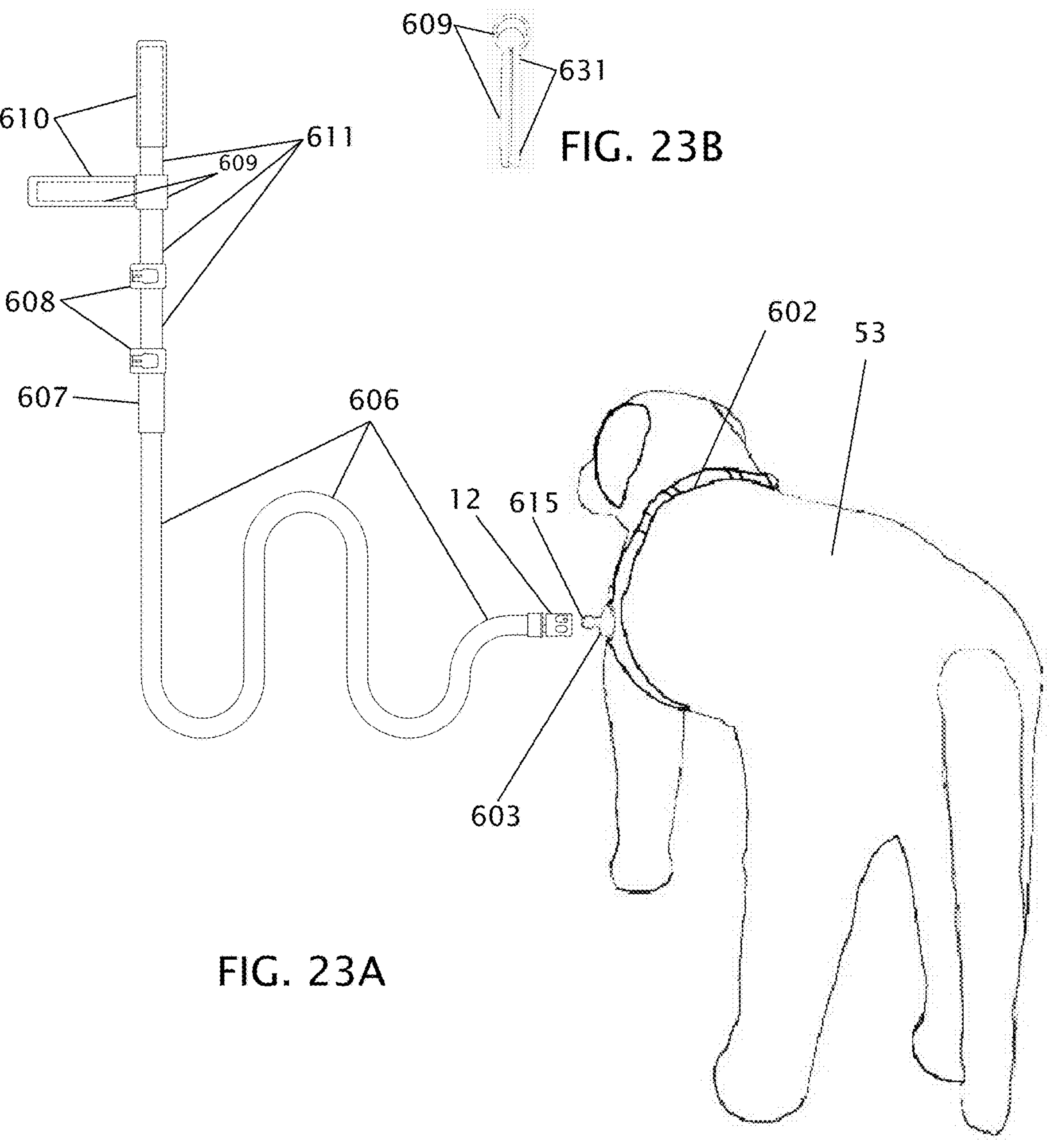
FIG. 23A is a side perspective view of a side mount attachment frame of FIG. 21 in position for attachment to a dog harness and dog.
FIG. 23B is a detailed top view of a horizontal handle stem and attachment ring of FIG. 23A.

FIG. 23A is a side perspective view of an example side mount attachment frame of FIG. 21 in position for attachment to a dog harness and a medium sized dog. FIG. 23C is a side view of the dog harness and dog of FIG. 23A. In this example, the example side mount attachment frame has a spacer coil comprising a first proximal "U" section 270, an inverted U section 272, and a distal "U" section 274 with a short horizontal extension 674.

In this example, the connector assembly is a quick connect assembly.

FIG. 24 is a side perspective view of a three-strap buckle connector 619. FIG. 25 is a top view of the three-strap buckle connector of FIG. 24. In this example, the three-strap buckle connector 619 comprises a horizontally-oriented male coupler 615 projecting outwardly from a connector base 603 which is attached to a no pull strap harness 602. The harness is adjustable and requires a snug fit to work properly. In this example, the male coupler side mount puck is a three-strap connector. Three harness straps are routed through slots 620 on the connector base 619.

FIG. 23B is a detailed top view of a horizontal handle stem 609 and handle attachment ring 631. The attachment ring comprises a bolt and nut to mount the attachment ring to clamp to the vertical handle 611.

The assembled unit is rigid except for the semi-rigid spacer coil which is high strength ¾ inch furniture grade PVC and has slight flex under force. This slight flex by the space coil under force dissipates force transferred to the dog-human connection assembly whether side-mount or top-mount and to the adjustable handle. This allows all components to be comprised of lighter-weight materials and thicknesses.

Example—Side-Mount Attachment Frame with Enhanced Quick Connect Assembly

In this example, an enhanced quick connect assembly provides a stronger connection, between the side-mount attachment frame and a dog harness, than the previous example quick connect assembly. The enhanced quick connect assembly is able to withstand more external force than the quick connect assembly.

Figures 36A, 36B, 36C, 36D, 36E, 36F:
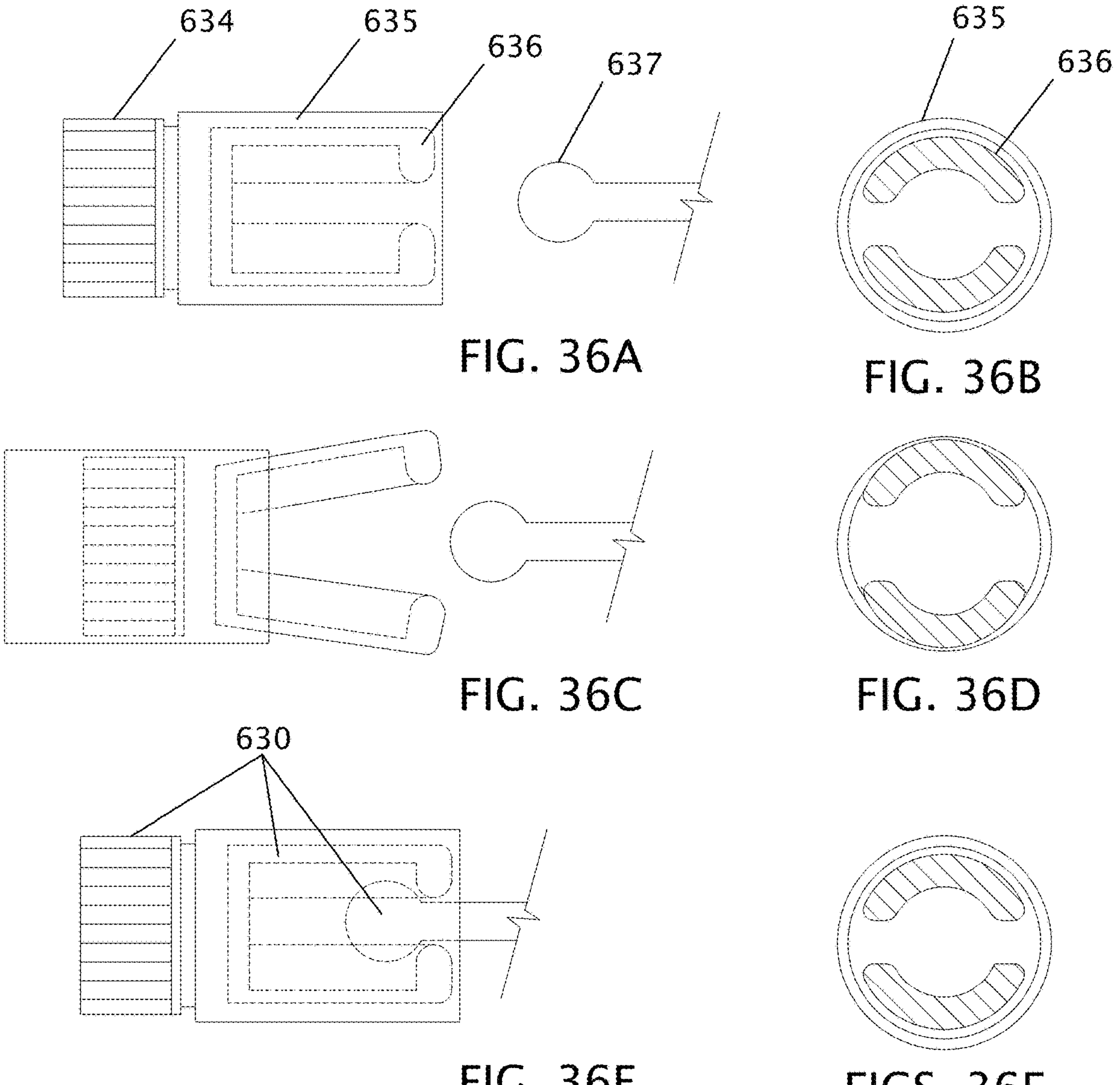
FIG. 36A is a cross section side view showing the alignment of an enhanced quick connection assembly prior to insertion.
FIG. 36B is a front view of the female portion of the quick connection assembly of FIG. 36A.
FIG. 36C is a cross section side view showing the opening of catch tabs on the enhanced quick connection assembly of FIG. 36A.
FIG. 36D is a front view of the female portion of the quick connection assembly of FIG. 36C.
FIG. 36E is a cross section side view showing the catch tabs on the enhanced quick connection assembly of FIG. 36A securing a male connector.
FIG. 36F is a front view of the female portion of the quick connection assembly of FIG. 36E.

FIGS. 36A, 36C, and 36E are cross section side views showing the alignment and connection of an enhanced quick connect assembly 630. In this example, a female connector 634 is provided on the distal end of a side-mount attachment frame, and a spherical male connector 637 is attached to a harness. The spherical male connector 637 extends from a male connector stem 660.

FIG. 36A shows the male connector 637 aligned for insertion into the female connector 634. FIG. 36C shows a spring loaded external cylinder 635 of female connector pulled back so that a pair of catch collars 636*a* and 636*b* can open to accept the male connector 637. FIG. 36E shows the spring loaded external cylinder 635 pulled back over the pair of catch collars 636*a* and 636*b* and over the male connector 637.

This scaled up connection includes converting the male connector 615 of the quick connect 637 to a full spherical male connector 637; and replacing the female quick connect catch tabs 626 with enlarged catch collars 636*a* and 636*b*. These enhancements provide a more secure connection between male and female connectors and subsequently between dog and human.

The operational mechanism is similar to the quick connection assembly, in that the spring-loaded external cylinder 635 is pulled towards the threaded female connection 634, thereby allowing the catch collars to be exposed and spring open so that the male connector full sphere 637 can be inserted between the catch collars. When the external cylinder 635 is released, it springs back into place over the catch collars and locks the catch collars in place to secure the male connector 637 within the external cylinder 635. An omnidirectional pivot angle of 20 degrees is preferably also maintained in this assembly.

FIG. 36B is a front view of the female connector showing the pair of catch collars 636*a* and 636*b* contained within the external cylinder 635. FIG. 36D is a front view of the female connector showing the catch collars expanded as the external cylinder 635 is pulled back toward the threaded connection.

To accommodate larger dogs at 60 pounds, or greater, all components of this device are scaled up accordingly. The handle, spacer coil, no pull harness, standard collar and tubular saddle harness are proportionately increased in size, thickness and diameter of tubing used. It is the connection point between male and female connectors that is still paramount to a successful attachment of dog to human.

Example—Side-Mount Attachment Frame with Threaded Housing Connection Assembly

Figures 37A, 37B:
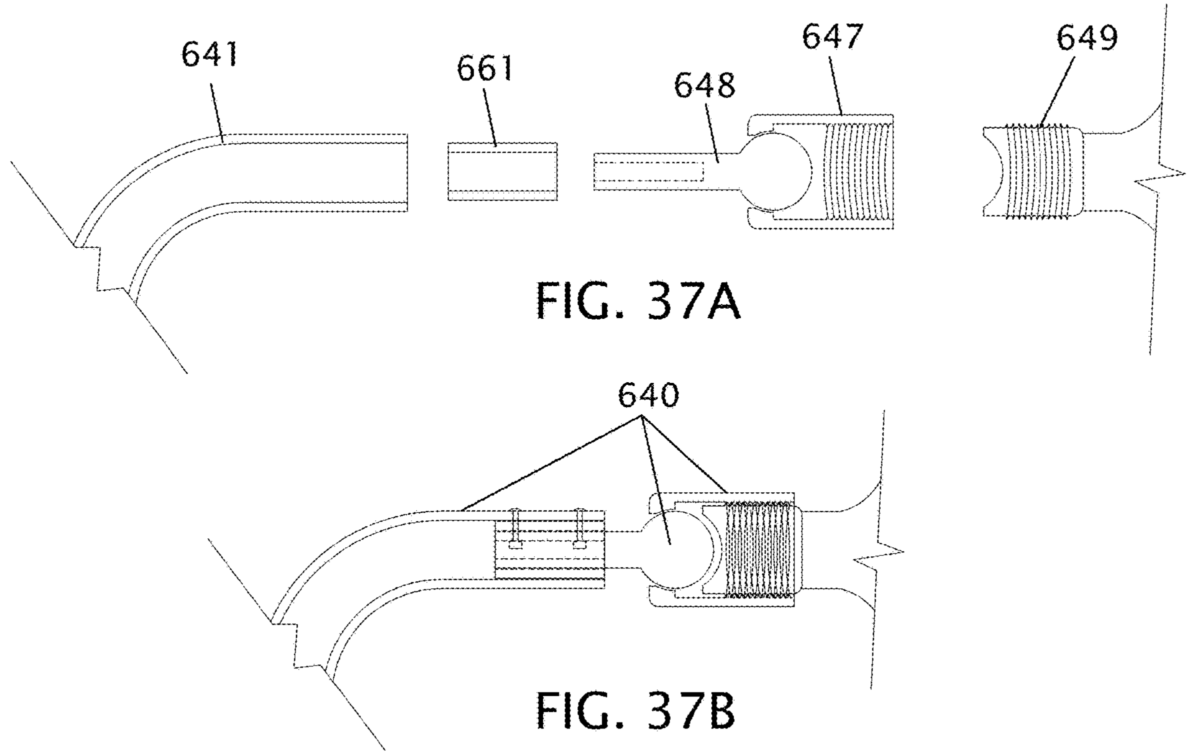
FIG. 37A is an exploded cross section view of a threaded housing connection assembly
FIG. 37B is a cross section view of the threaded housing connection assembly of FIG. 37A with a threaded connection secured.

FIG. 37A is an exploded cross section view of a threaded housing connection assembly 640. FIG. 37B is a cross section view of the threaded housing connection assembly of FIG. 37A with a threaded connection secured. In this example, a spherical male connector 648 is confined within a female threaded housing 647.

This device is intended for reasonably behaved dogs that will respond to their owners' commands on at least a basic level. An alternative use for this scaled-up connector option is for at risk dogs that maybe be a danger to strangers and other dogs. Once again, the point of connection at the male and female connectors is the most critical element to ensure a secure connection between dog and human.

The intent is to create a connection that will not separate under the most extreme forces that can be exerted in maintaining the human and dog connection. The male connector half sphere or full sphere is replaced by a male-threaded post with an exposed concavity at the connection point. The female connector cylinder has internal female threads and spherical male connector 648 and stem 661. The stem and insert coupler are inserted into the spacer coil tubing and riveted securing the female connector to the spacer coil. The deliberate connection is made when the female connector is threaded onto male threaded post and tighten to capture all exposed threads. The full sphere with stem internal to the female connector juxtaposes with the concavity on the male threaded post and establishes a highly secure connection with 20-degree pivot angle flexibility.

Example—Attachment of Single-Strap Connector to Dog Collar

Figure 29:
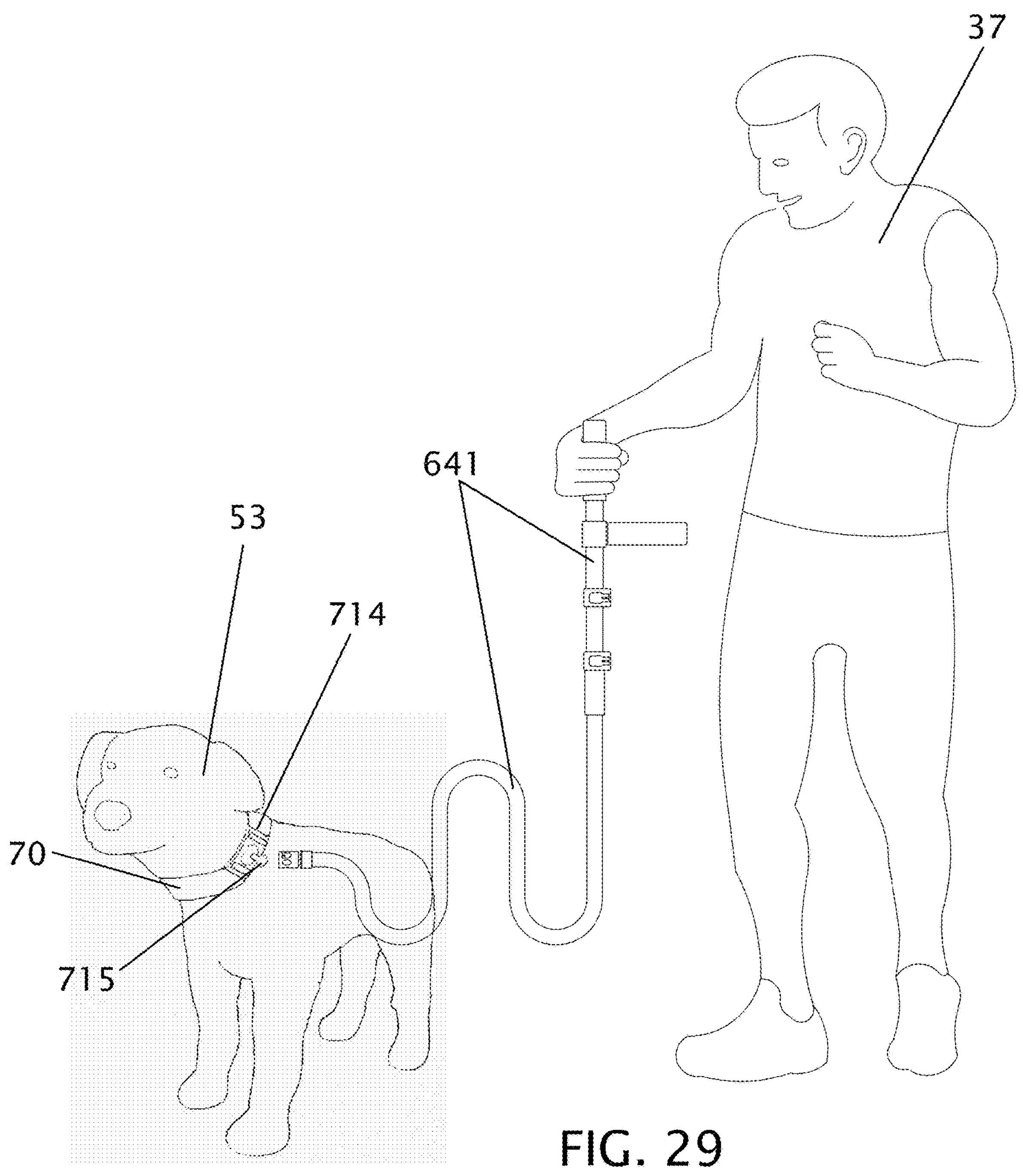
FIG. 29 is a side perspective view of a side mount attachment frame of FIG. 21 in position for attachment to a dog collar and dog, frame in relation to a dog and a dog walker.

FIG. 29 is a front perspective view of a single strap buckle connector 714 with a side mount. The side-mount handle, spacer coil and female coupler (for medium size dogs) is paired with the single-strap buckle connector attached to a traditional and adjustable dog collar coupler for side mount attachment to medium-sized dog.

Example—Tubular Saddle-Harness Side Mount Attachment

Figure 31:
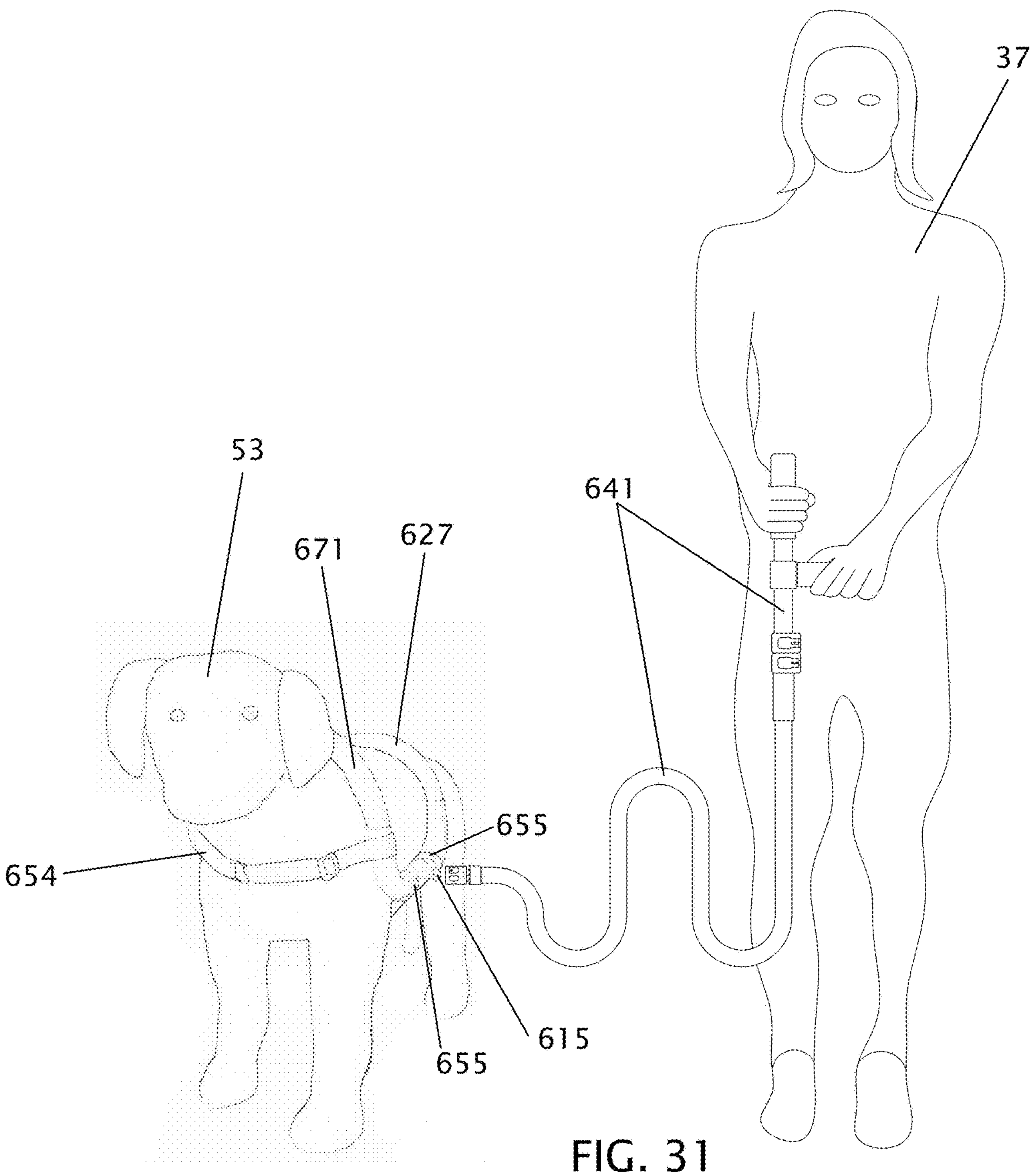
FIG. 31 is a side perspective view of a side mount attachment frame of FIG. 21 in position for attachment to a tubular harness in relation to a dog and a dog walker.
Figures 32A, 32B, 33:
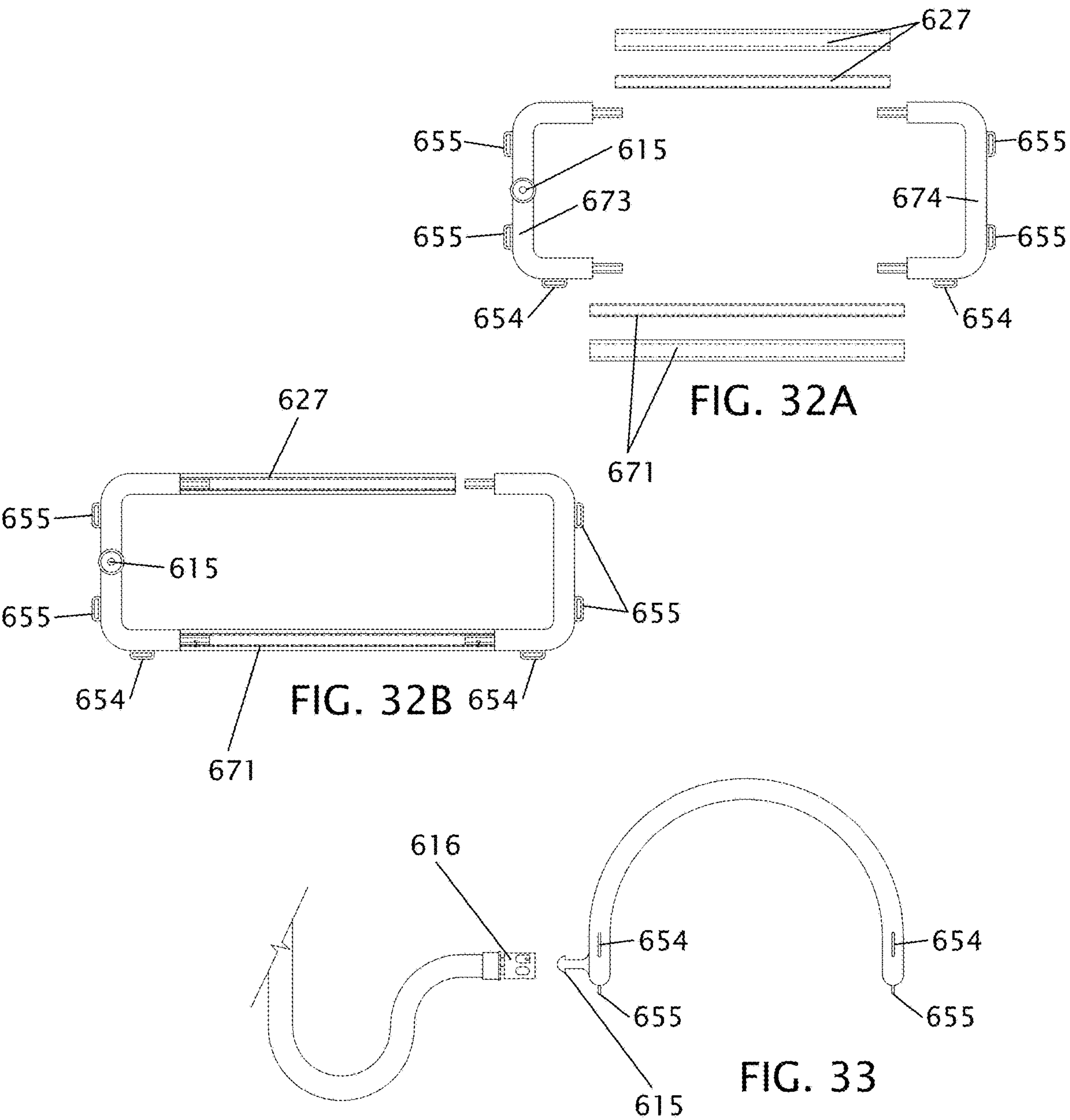
FIG. 32A is an exploded top view of a harness with a side mount connection.
FIG. 32B is top view of a partially assembled harness of FIG. 32A.
FIG. 33 is a side view of a harness frame element with a quick connection element.
Figures 34A, 34B:
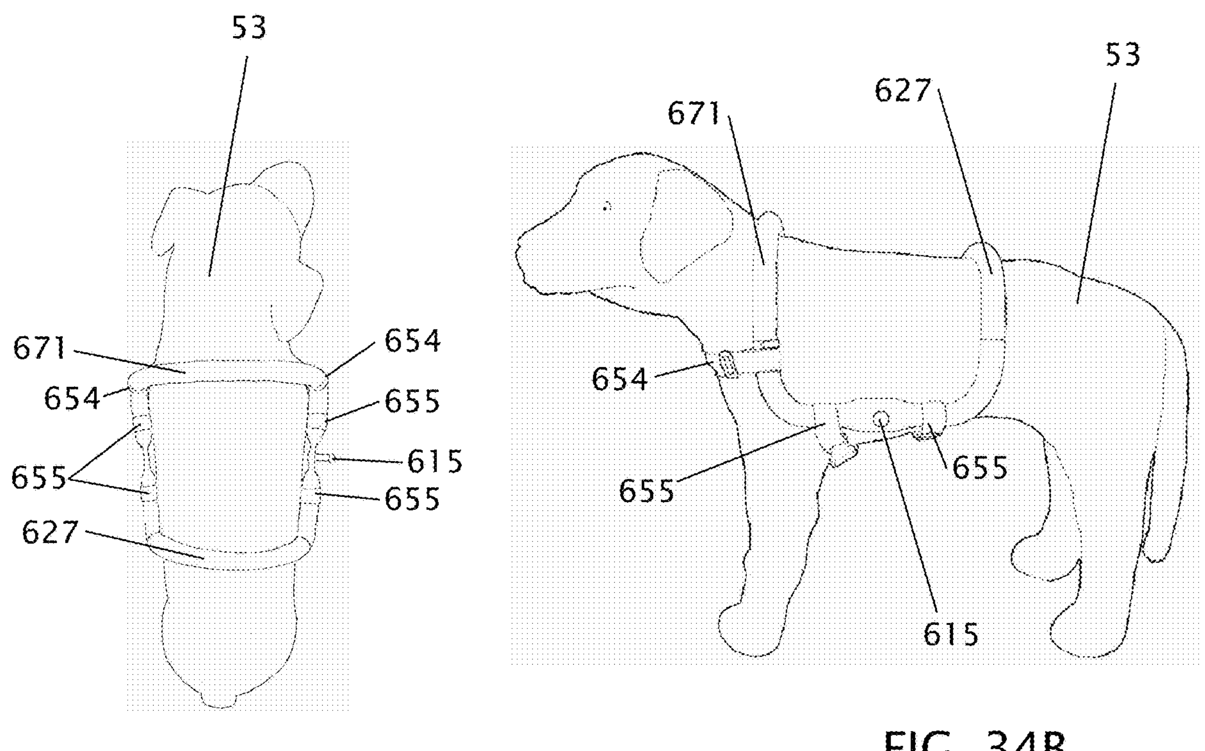
FIG. 34A is a side view of a harness configured with a right-side attachment.
FIG. 34B is a top view of a harness configured with a left-side attachment.

FIG. 34A is a side-view of a tubular harness 650 configured for a medium size dog with a weight of 25-60 pounds. FIG. 34B is a top view of a tubular harness 650 of FIG. 34A. FIG. 33 is a side view of a harness frame element with a quick connection element. FIG. 31 is a side view of a dog and dog harness with a quick-connection element.

In this example, a tubular frame is positioned like a saddle over the dog's back. A female connector 612 is provided on a side of the tubular frame and is configured to accept a male connector 615 that is attached to the distal end of a side mount attachment frame.

FIG. 32A is an exploded view showing the components of the tubular saddle harness of FIG. 34A. FIG. 32B is a top view of a partially assembled tubular harness. In this example, the tubular harness components include a front arcing tube 671 configured to be placed behind a dog's head; and a rear arcing tube 672 configured to be placed over a dog's back. Two rails, a left side rail 673 and a right side rail 674 connect the front and rear arcing tubes. Two straps, an adjustable chest strap 654 and an adjustable abdominal strap 655 connect the right side and left side rails.

The front arcing tube 671 closest to the dog's head is larger in diameter than the rear arcing tube 672 at the tail-end of the dog's torso. In one example, the front and rear arcing tubes of the tubular saddle harness are a 1" schedule 40 PVC material, and are shaped by heat manipulation, and the assembly maintains its saddle shape when not connected to the dog.

FIG. 31 is a side perspective view of a side mount attachment frame of FIG. 21 in position for attachment to a tubular harness in relation to a dog and a dog walker. The tubular saddle harness 650 will transfer a higher level of sensory control from human to dog relative to a strap harness. The saddle-shaped, semi-rigid, contiguous-tubular assembly absorbs and transmits radiating vibrations emanating from the side-mount connection assembly is mated with a male coupler attached to the tubular saddle harness.

It is to be understood that the specific embodiments and examples described above are by way of illustration, and not limitation. Various modifications may be made by one of ordinary skill.

What is claimed is:

1. A dog walking device comprising
- a side mount attachment frame configured to maintain a lateral distance between a dog and a human while the dog and the human are walking or jogging on a surface, the frame comprising
  - a proximal frame portion; and
  - a spacer coil frame configured to provide a vertical offset and a horizontal offset between the dog and the human, the spacer coil frame section comprising
    - a vertically-oriented proximal U-shaped section,
    - a vertically-oriented first inverted U-shaped section, and
    - a distal U-shaped section;
- a grip on the proximal frame portion, the grip configured to be grasped by at least one human hand; and
- a horizontally-oriented connector pair comprising
  - a female connection element positioned on the distal U-shaped section of the spacer coil frame, and
  - a male connection element attached to a harness or collar such that the female connection element and the male connection element are configured to be releasably mated.

2. The dog walking device of claim 1 wherein the vertical offset is within the range of 12 to 48 inches.

3. The dog walking device of claim 1 further comprising at least one light.

4. The dog walking device of claim 1 wherein the grip comprises a first
- vertically-oriented grip; and
- a second horizontally-oriented grip.

5. The dog walking device of claim 3 further comprising a plurality of LED lights.

6. The dog walking device of claim 1 wherein the connector pair is a quick-connector pair comprising
- a female connection element comprising
  - an internal channel, and
  - a plurality of catch tabs; and
- a male connection element comprising
  - a stem, and
  - a hemispherical or spherical male connector extending from the stem.

7. The dog walking device of claim 6 wherein
- the female connection element comprises three catch tabs, and
- the male connector is hemispherical.

8. The dog walking device of claim 6 wherein
- the female connection element comprises two hemispherical catch tabs, and
- the male connector is spherical.

9. The dog walking device of claim 6 further comprising
- a tubular harness comprising
  - an arced head frame section configured to fit behind a dog's head,
  - an arced tail frame section configured to fit over a dog's back,
  - a right-side frame section connecting the arced head frame section and the arced tail frame section,
  - a left-side frame section connecting the arced head frame section and the arced tail frame section,
  - such that the male connection element is attached to the right-side frame section or the left-side frame section.

10. The dog walking device of claim 9 wherein
- the female connection element comprises three catch tabs, and
- the male connector is hemispherical.

11. The dog walking device of claim 9 wherein
- the female connection element comprises two hemispherical catch tabs, and
- the male connector is spherical.

12. The dog walking device of claim 6 further comprising
- a strap harness, and
- a male connection element base comprising at least one slot configured to mount the male connection element base on the strap harness, such that the male connection element is mounted on the male connection element base.

13. A method for maintaining a lateral distance between a dog and a human while the dog and the human are walking or jogging on a surface, the method comprising
- providing a dog walking device comprising
  - a proximal frame portion; and a spacer coil frame configured to provide a vertical offset and a horizontal offset between the dog and the human, the spacer coil frame section comprising a vertically-oriented proximal U-shaped section, and a vertically-oriented first inverted U-shaped section, a distal U-shaped section;

a grip on the proximal frame portion, the grip configured to be grasped by at least one human hand; and a horizontally-oriented connector pair comprising a female connection element positioned on the distal U-shaped section of the spacer coil frame, and a male connection element attached to a harness or collar such that the female connection element and the male connection element are configured to be releasably mated;

attaching the distal U-shaped frame portion of the dog walking device to a dog harness or collar;

and gripping the grip while walking, jogging, or running.

14. A dog walking device comprising a top mount attachment frame configured to maintain a lateral distance between a dog and a human while the dog and the human are walking or jogging on a surface, the top mount attachment frame comprising a proximal frame portion; and a-spacer coil frame configured to provide a vertical offset and a horizontal offset between the dog and the human, the spacer coil frame section comprising a vertically-oriented proximal U-shaped section, and a vertically-oriented inverted U-shaped section;

a grip on the proximal frame portion, the grip configured to be grasped by at least one human hand; and a vertically-oriented connector pair comprising a female connection element positioned on the distal end of the vertically-oriented inverted U-shaped section, the female connection element comprising an internal channel, and a plurality of catch tabs; and a male connection element comprising a stem, and a hemispherical or spherical male connector extending from the stem.

* * * * *